United States Patent
Wang et al.

(10) Patent No.: US 9,464,188 B2
(45) Date of Patent: *Oct. 11, 2016

(54) SIMULTANEOUS PLASTICIZATION AND COMPATIBILIZATION PROCESS AND COMPOSITIONS

(71) Applicant: Kimberly-Clark Worldwide, Inc., Neenah, WI (US)

(72) Inventors: James Hongxue Wang, Appleton, WI (US); Gregory James Wideman, Menasha, WI (US); Feng Chen, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/014,685

(22) Filed: Aug. 30, 2013

(65) Prior Publication Data

US 2016/0009912 A1   Jan. 14, 2016

(51) Int. Cl.
*A61F 13/15* (2006.01)
*B29B 9/06* (2006.01)
*B29C 47/00* (2006.01)
(Continued)

(52) U.S. Cl.
CPC  *C08L 51/06* (2013.01); *C08J 3/18* (2013.01); *C08J 3/201* (2013.01); *C08J 3/203* (2013.01); *C08J 5/18* (2013.01); *C08L 3/00* (2013.01); *C08L 3/02* (2013.01); *C08L 23/06* (2013.01); *B29B 9/06* (2013.01); *B29B 9/16* (2013.01); *B29C 47/0014* (2013.01); *B29C 47/0016* (2013.01); *B29C 47/0021* (2013.01); *B29C 47/0057* (2013.01); *B29C 47/884* (2013.01); *B29C 47/8895* (2013.01); *C08J 2303/02* (2013.01); *C08J 2323/06* (2013.01); *C08J 2403/02* (2013.01); *C08J 2423/06* (2013.01); *C08J 2423/08* (2013.01); *C08J 2451/06* (2013.01)

(58) Field of Classification Search
CPC .............. B29B 9/02; B29C 2793/009; B29C 47/0021; B29C 47/34; B29C 47/884; B29C 47/8845; B29C 47/8895; B29K 2995/0056; B29K 2995/006
USPC ................ 428/220; 264/141, 178 R; 425/71; 524/798; 525/418

See application file for complete search history.

(56) References Cited

U.S. PATENT DOCUMENTS

| | | |
|---|---|---|
| 4,337,181 A | 6/1982 | Otey et al. |
| 5,095,054 A | 3/1992 | Lay et al. |

(Continued)

FOREIGN PATENT DOCUMENTS

| | | |
|---|---|---|
| WO | WO 00/02955 A1 | 1/2000 |
| WO | WO 2011/080623 A2 | 7/2011 |

(Continued)

*Primary Examiner* — William Cheung
(74) *Attorney, Agent, or Firm* — Kimberly-Clark Worldwide, Inc.

(57) ABSTRACT

A continuous process for manufacturing a blended polymer includes mixing a native starch, a polyolefin, and a compatibilizer; and forming the blended polymer from the resulting mixture using an extruder. The process can also include mixing the native starch, the polyolefin, and the compatibilizer in the extruder. The polyolefin can be a petroleum- or bio-based polyethylene, and the compatibilizer can be a maleic anhydride grafted polyolefin. The process can further include mixing a processing aid such as glycerin, and forming the blended polymer into a film.

19 Claims, 21 Drawing Sheets

(51) Int. Cl.
*B28B 5/00* (2006.01)
*C08F 220/18* (2006.01)
*C08F 283/00* (2006.01)
*C08L 51/06* (2006.01)
*C08J 3/18* (2006.01)
*C08J 5/18* (2006.01)
*C08L 3/02* (2006.01)
*C08L 23/06* (2006.01)
*C08J 3/20* (2006.01)
*C08L 3/00* (2006.01)
*B29B 9/16* (2006.01)
*B29C 47/88* (2006.01)

(56) References Cited

U.S. PATENT DOCUMENTS

| | | |
|---|---|---|
| 5,314,934 A | 5/1994 | Tomka |
| 5,461,094 A | 10/1995 | Yoo et al. |
| 5,496,895 A | 3/1996 | Chinnaswamy et al. |
| 5,510,401 A | 4/1996 | Dehennau et al. |
| 5,635,550 A | 6/1997 | Dehennau et al. |
| 5,696,186 A | 12/1997 | Videau |
| 6,211,325 B1 | 4/2001 | Sun et al. |
| 6,242,102 B1 | 6/2001 | Tomka |
| 6,472,497 B2 | 10/2002 | Loercks et al. |
| 6,972,133 B1 * | 12/2005 | Denesuk .............. A01K 15/026 424/400 |
| 7,608,649 B2 | 10/2009 | Sun et al. |
| 7,854,994 B2 | 12/2010 | Henderson-Rutgers et al. |
| 7,985,794 B2 | 7/2011 | Narayan et al. |
| 2003/0119949 A1 | 6/2003 | Favis et al. |
| 2006/0111511 A1 | 5/2006 | Narayan et al. |
| 2006/0194902 A1 | 8/2006 | Nie et al. |
| 2008/0287592 A1 | 11/2008 | Favis et al. |
| 2009/0048368 A1 | 2/2009 | Bash et al. |
| 2010/0311874 A1 | 12/2010 | Mentink et al. |
| 2010/0311905 A1 | 12/2010 | Mentink et al. |
| 2011/0086949 A1 | 4/2011 | Mentink et al. |
| 2011/0177269 A1 | 7/2011 | Morris |
| 2011/0196071 A1 | 8/2011 | Mentink et al. |
| 2012/0009387 A1 | 1/2012 | Wang et al. |
| 2012/0232191 A1 | 9/2012 | Auffermann et al. |
| 2012/0289629 A1 | 11/2012 | Saint-Loup et al. |

FOREIGN PATENT DOCUMENTS

| | | |
|---|---|---|
| WO | WO 2011/117549 A1 | 9/2011 |
| WO | WO 2013/093781 A1 | 6/2013 |

* cited by examiner

SIMULTANEOUS PLASTICIZATION AND COMPATIBILIZATION PROCESS AND COMPOSITIONS

BACKGROUND

The present disclosure relates to extruded films, particularly those incorporating native starches.

The direct use of starch into plastic films is of high economic value due to the low cost, renewability, and abundance of starch. Multi-step compounding, however, is typically required to convert starch into useful thermoplastic materials, and this adds processing costs to material that would otherwise be a good value. One major technical challenge was successfully overcome with the development of novel one-step processing of compatibilized films including polyethylene (PE), thermoplastic starch (TPS), and a biodegradable copolyester polymer. Although a technical solution, these films are not economically feasible due to the expensive nature of the biodegradable component required to produce a compatible system: the biodegradable copolyester polymer resin.

SUMMARY

To create economic value, there was a need to develop one-step processing of binary PE/TPS-blend films without using the expensive biodegradable copolyester component. Although initial efforts were not successful, extensive experimentation led to the development of a single-step process to make low-cost PE/TPS blends for further processing into films. This material fulfills a technical and business gap by bringing a cost-advantaged composition and process to commercial scale to enable renewable/bio-based personal care products.

This disclosure uses novel simultaneous plasticization and compatibilization processes to create a number of biopolymer blend compositions.

The present disclosure accomplishes this by presenting a continuous process for manufacturing a blended polymer including mixing a native starch, a polyolefin, and a compatibilizer; and forming the blended polymer from the resulting mixture using an extruder.

The present disclosure also accomplishes this by presenting a continuous process for manufacturing a blended polymer including mixing a native starch, a polyolefin, and a compatibilizer in an extruder; and forming the blended polymer from the resulting mixture using the extruder.

Also presented is a continuous process for manufacturing a blended polymer including mixing a native starch, polyethylene, and a maleic anhydride grafted polyolefin in an extruder; and forming the blended polymer from the resulting mixture using the extruder.

Disclosed is a process to directly convert non-thermoplastic starch, polyolefins, and a compatibilizer in a single pass. This simultaneous plasticization and compatibilization process produced tertiary, engineered polymer blends with desired mechanical properties and processability for cast film.

Simplifying the processing steps was the key to this process. This disclosure covers: 1) petroleum-based PE/TPS blend films; 2) green PE (i.e., bio-based or renewable PE)/TPS blend films, and 3) processing conditions for making blend films. In general, the cost of both PE/TPS and green PE/TPS blend films is reduced by increasing the loading level of in situ-formed TPS, and the renewability of PE/TPS blends will be increased by increasing TPS content.

This disclosure also showed that FUSABOND modified polymers (e.g., maleic anhydride grafted polyolefin) are a preferred compatibilizer. Smooth and soft films resulted, and excellent film processability was achieved, leading to very thin films (~0.8 mil) when the TPS loading level is less than 60%.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figures 1A, 1B:
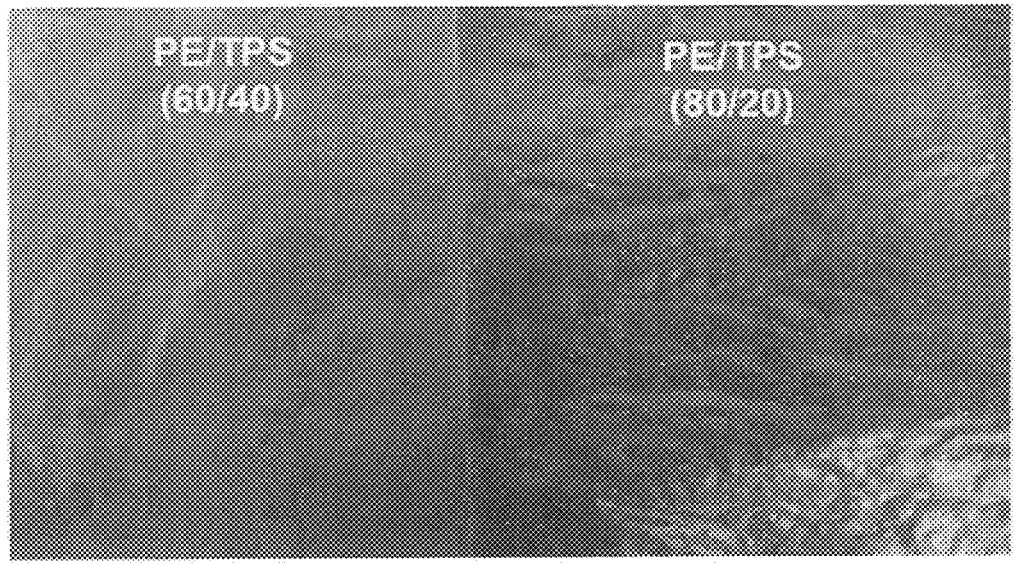
FIG. 1A illustrates the appearance and quality of PE/TPS (60/40 w/w) blend films.
FIG. 1B illustrates the appearance and quality of PE/TPS (80/20 w/w) blend films.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

While the specification concludes with the claims particularly pointing out and distinctly claiming the disclosure, it is believed that the present disclosure will be better understood from the following description.

All percentages, parts and ratios are based upon the total weight of the compositions of the present disclosure, unless otherwise specified. All such weights as they pertain to listed ingredients are based on the active level and, therefore, do not include solvents or by-products that can be included in commercially available materials, unless otherwise specified. The term "weight percent" can be denoted as "wt. %" herein. Except where specific examples of actual measured values are presented, numerical values referred to herein should be considered to be qualified by the word "about."

Disclosed is a novel process to directly convert non-thermoplastic starch, polyolefins, and a compatibilizer in a single pass. This simultaneous plasticization and compatibilization process produces tertiary, engineered polymer blends with desired mechanical properties and processability for cast film for use in low cost, 100% sustainable packaging and product applications.

Starch has a narrow thermal processing window due to its non-thermoplasticity and thermal instability. Reported successful TPS blends require multiple processing steps that increase processing costs. It was surprisingly discovered that using certain, optimal processing equipment and formulations, starch can be plasticized and blended simultaneously. In addition, elimination of the need for expensive biodegradable copolyester blends significantly reduces the costs of the final products.

Single-step plasticization of starch and blending with PE during compounding has not been previously successful. Previous trials were only successful on ternary TPS blends of PE, TPS, and copolyester blends. In previous work, attempts to produce binary films without copolyester blends have had poor aesthetic and mechanical properties. The present application provides binary films with good aesthetic and mechanical properties, making this work unique and cost beneficial.

In various aspects, the processes described herein can produce films using blends of TPS and petroleum-based PE and blends of TPS and sugarcane-derived green PE, with a compatibilizer such as maleic anhydride grafted polyolefin such as FUSABOND polymer, available from DuPont Company (Wilmington, Del.). The resulting films reduce the cost of both petroleum-based PE/TPS and green PE/TPS blend films by increasing the loading level of in situ formed TPS. In addition, the renewability of such PE/TPS blends will be increased with increasing TPS content.

Materials used herein include a native starch such as corn starch, which is a non-thermoplastic starch. Although starch is produced in many plants, typical sources includes seeds of cereal grains, such as corn, waxy corn, wheat, sorghum, rice, and waxy rice; tubers, such as potatoes; roots, such as tapioca (i.e., cassava and manioc), sweet potato, and arrowroot; and the pith of the sago palm. The term "native starch" as used herein refers to unmodified starch separated from such plants. The term "modified starch" as used herein refers to starches that have been modified chemically or enzymatically by the typical processes known in the art (e.g., esterification, etherification, oxidation, acidic hydrolysis, enzymatic hydrolysis, crosslinking, carboxymethylation, etc.). Typical modified starches are starch ethers (e.g. methyl starch, ethyl starch, propyl starch, etc.), esters (e.g. starch acetate, starch propionate, starch butyrate, etc.), hydroxyalkyl starches (hydroxymethyl starch hydroxyethyl starch, hydroxypropyl starch, etc.); carboxymethyl starches, etc.

Regardless of whether starch is in a native or modified form, the starch can contain different percentages of amylose and amylopectin, different size starch granules and different polymeric weights for amylose and amylopectin. High amylose starches contain greater than about 50% by weight amylose and low amylose starches contain less than about 50% by weight amylose. Although not required, low amylose starches having an amylose content of from about 10% to about 40% by weight, and in some aspects, from about 15% to about 35% by weight, are particularly suitable for use in the present disclosure. Examples of such low amylose starches include corn starch and potato starch, both of which have an amylose content of approximately 20% by weight. Such low amylose starches typically have a number average molecular weight ("$M_n$") ranging from about 50,000 to about 1,000,000 grams per mole, in some aspects from about 75,000 to about 800,000 grams per mole, and in some aspects, from about 100,000 to about 600,000 grams per mole, as well as a weight average molecular weight ("$M_w$") ranging from about 5,000,000 to about 25,000,000 grams per mole, in some aspects from about 5,500,000 to about 15,000,000 grams per mole, and in some aspects, from about 6,000,000 to about 12,000,000 grams per mole. The ratio of the weight average molecular weight to the number average molecular weight ("$M_w/M_n$"), i.e., the "polydispersity index", is also relatively high. For example, the polydispersity index can range from about 20 to about 100. The weight and number average molecular weights can be determined by methods known to those skilled in the art.

Materials used also include a polyolefin. One such polyolefin commonly used is polyethylene, either typical petroleum-based PE or a green version such as Braskem SLL318, bio-based polyethylene resin with a melt flow of 2.94 g/10 minutes at 190° C., available from Braskem Company (Brazil).

Among other things, the polyolefin helps to counteract the stiffness of the thermoplastic starch, thereby improving the ductility and melt processability of the film. Such polyolefins are typically employed in an amount of from about 10 wt. % to about 50 wt. %, in some aspects from about 20 wt. % to about 45 wt. %, and in some aspects, from about 25 wt. % to about 40 wt. % of the polymer content of the thermoplastic composition.

Exemplary polyolefins for this purpose can include, for instance, polyethylene, polypropylene, blends and copolymers thereof. In one particular aspect, a polyethylene is employed that is a copolymer of ethylene and an α-olefin, such as a $C_3$-$C_{20}$ α-olefin or $C_3$-$C_{12}$ α-olefin. Suitable α-olefins can be linear or branched (e.g., one or more $C_1$-$C_3$ alkyl branches, or an aryl group). Specific examples include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin co-monomers are 1-butene, 1-hexene and 1-octene. The ethylene content of such copolymers can be from about 60 mole % to about 99 mole %, in some aspects from about 80 mole % to about 98.5 mole %, and in some aspects, from about 87 mole % to about 97.5 mole %. The α-olefin content can likewise range from about 1 mole % to about 40 mole %, in some aspects from about 1.5 mole % to about 15 mole %, and in some aspects, from about 2.5 mole % to about 13 mole %.

The density of the polyethylene can vary depending on the type of polymer employed, but generally ranges from 0.85 to 0.96 grams per cubic centimeter ("g/cm$^3$"). Polyethylene "plastomers", for instance, can have a density in the range of from 0.85 to 0.91 g/cm$^3$. Likewise, "linear low density polyethylene" ("LLDPE") can have a density in the range of from 0.91 to 0.940 g/cm$^3$; "low density polyethylene" ("LDPE") can have a density in the range of from 0.910 to 0.940 g/cm$^3$; and "high density polyethylene" ("HDPE") can have density in the range of from 0.940 to 0.960 g/cm$^3$. Densities can be measured in accordance with ASTM 1505. Particularly suitable ethylene-based polymers for use in the present disclosure can be available under the designation EXACT™ from ExxonMobil Chemical Company of Houston, Tex. Other suitable polyethylene plastomers are available under the designation ENGAGE™ and AFFINITY™ from Dow Chemical Company of Midland, Mich. Still other suitable ethylene polymers are available from The Dow Chemical Company under the designations DOWLEX™ (LLDPE) and ATTANE™ (ULDPE). Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes.

Of course, the present disclosure is by no means limited to the use of ethylene polymers. For instance, propylene polymers can also be suitable for use as a semi-crystalline polyolefin. Suitable propylene polymers can include, for instance, polypropylene homopolymers, as well as copolymers or terpolymers of propylene with an α-olefin (e.g., $C_3$-$C_{20}$), such as ethylene, 1-butene, 2-butene, the various pentene isomers, 1-hexene, 1-octene, 1-nonene, 1-decene, 1-unidecene, 1-dodecene, 4-methyl-1-pentene, 4-methyl-1-hexene, 5-methyl-1-hexene, vinylcyclohexene, styrene, etc. The comonomer content of the propylene polymer can be about 35 wt. % or less, in some aspects from about 1 wt. % to about 20 wt. %, and in some aspects, from about 2 wt. % to about 10 wt. %. The density of the polypropylene (e.g., propylene/α-olefin copolymer) can be 0.95 grams per cubic centimeter (g/cm$^3$) or less, in some aspects, from 0.85 to 0.92 g/cm$^3$, and in some aspects, from 0.85 g/cm$^3$ to 0.91 g/cm$^3$. Suitable propylene polymers are commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques can generally be employed to form the polyolefins. For instance, olefin polymers can be formed using a free radical or a coordination catalyst (e.g., Ziegler-Natta or metallocene). Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al., which are incorporated herein in their entirety by reference thereto for all purposes.

The melt flow index (MI) of the polyolefins can generally vary, but is typically in the range of about 0.1 grams per 10 minutes to about 100 grams per 10 minutes, in some aspects from about 0.5 grams per 10 minutes to about 30 grams per 10 minutes, and in some aspects, about 1 to about 10 grams per 10 minutes, determined at 190° C. The melt flow index is the weight of the polymer (in grams) that can be forced through an extrusion rheometer orifice (0.0825-inch diameter) when subjected to a force of 2160 grams in 10 minutes at 190° C., and can be determined in accordance with ASTM Test Method D1238-E.

A compatibilizer such as FUSABOND maleic anhydride grafted polyolefin is also used. Most pairs of polymers are immiscible with each other, and have less compatibility than would be required to obtain the desired level of properties and performance from their blends. Compatibilizers are often used as additives to improve the compatibility of immiscible polymers and thus improve the morphology and resulting properties of the blend. Similarly, it is often challenging to disperse fillers effectively in the matrix polymer of a composite, or to adhere layers of polymers to each other or to other substrates. A compatibilizer can be any polymeric interfacial agent that facilitates formation of uniform blends of normally immiscible polymers with desirable end properties.

To improve the compatibility and dispersion characteristics of biopolymers and polyolefins, a compatibilizer is employed in the thermoplastic composition. Typically, the compatibilizer constitutes from about 0.1 wt. % to about 15 wt. %, in some aspects from about 0.5 wt. % to about 10 wt. %, and in some aspects, from about 1 wt. % to about 5 wt. % of the composition. The compatibilizer generally possesses a polar component provided by one or more functional groups that are compatible with the biopolymer and a non-polar component provided by an olefin that is compatible with the polyolefin. The olefin component of the compatibilizer can generally be formed from any linear or branched α-olefin monomer, oligomer, or polymer (including copolymers) derived from an olefin monomer. For example, the compatibilizer can include polyethylene-co-vinyl acetate (EVA), polyethylene-co-vinyl alcohol (EVOH), polyethylene-co-acrylic (EAA), etc. in which the olefin component is provided by the polyethylene backbone. In other aspects, the olefin component can be formed from an α-olefin monomer, which typically has from 2 to 14 carbon atoms and preferably from 2 to 6 carbon atoms. Examples of suitable monomers include, but not limited to, ethylene, propylene, butene, pentene, hexene, 2-methyl-1-propene, 3-methyl-1-pentene, 4-methyl-1-pentene, and 5-methyl-1-hexene. Examples of polyolefins include both homopolymers and copolymers, i.e., polyethylene, ethylene copolymers such as EPDM, polypropylene, propylene copolymers, and polymethylpentene polymers. An olefin copolymer can include a minor amount of non-olefinic monomers, such as styrene, vinyl acetate, diene, or acrylic and non-acrylic monomer. Functional groups can be incorporated into the polymer backbone using a variety of known techniques. For example, a monomer containing the functional group can be grafted onto a polyolefin backbone to form a graft copolymer. Such grafting techniques are well known in the art and described, for instance, in U.S. Pat. No. 5,179,164. In other aspects, the monomer containing the functional groups can be copolymerized with an olefin monomer to form a block or random copolymer.

Regardless of the manner in which it is incorporated, the functional group of the compatibilizer can be any group that provides a polar segment to the molecule, such as a carboxyl group, acid anhydride group, amide group, imide group, carboxylate group, epoxy group, amino group, isocyanate group, group having oxazoline ring, hydroxyl group, and so forth. Maleic anhydride modified polyolefins are particularly suitable for use in the present disclosure. Such modified polyolefins are typically formed by grafting maleic anhydride onto a polymeric backbone material. Such maleated polyolefins are available from E. I. du Pont de Nemours and Company under the designation FUSABOND, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation POLYBOND and Eastman Chemical Company under the designation Eastman G series, and AMPLIFY GR Functional Polymers (maleic anhydride grafted polyolefins). In one particular aspect, the compatibilizer is a graft copolymer of polyethylene and maleic anhydride having the structure shown below:

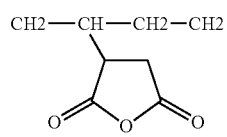

The cyclic anhydride at one end is chemically bonded directly into the polyethylene chain. The polar anhydride group of the molecule could, in one aspect, associate with hydroxyl groups of a starch biopolymer via both hydrogen bonding and polar-polar molecular interactions and a chemical reaction to form an ester linkage during the melt extrusion process. The hydroxyls of the starch will undergo esterification reaction with the anhydride to achieve a ring-opening reaction to chemically link the starch polymer to the maleic anhydride to the grafted polyethylene. This reaction is accomplished under the high temperatures and pressures of the extrusion process.

Finally, a processing aid such as glycerin can also be used.

Figure 12:
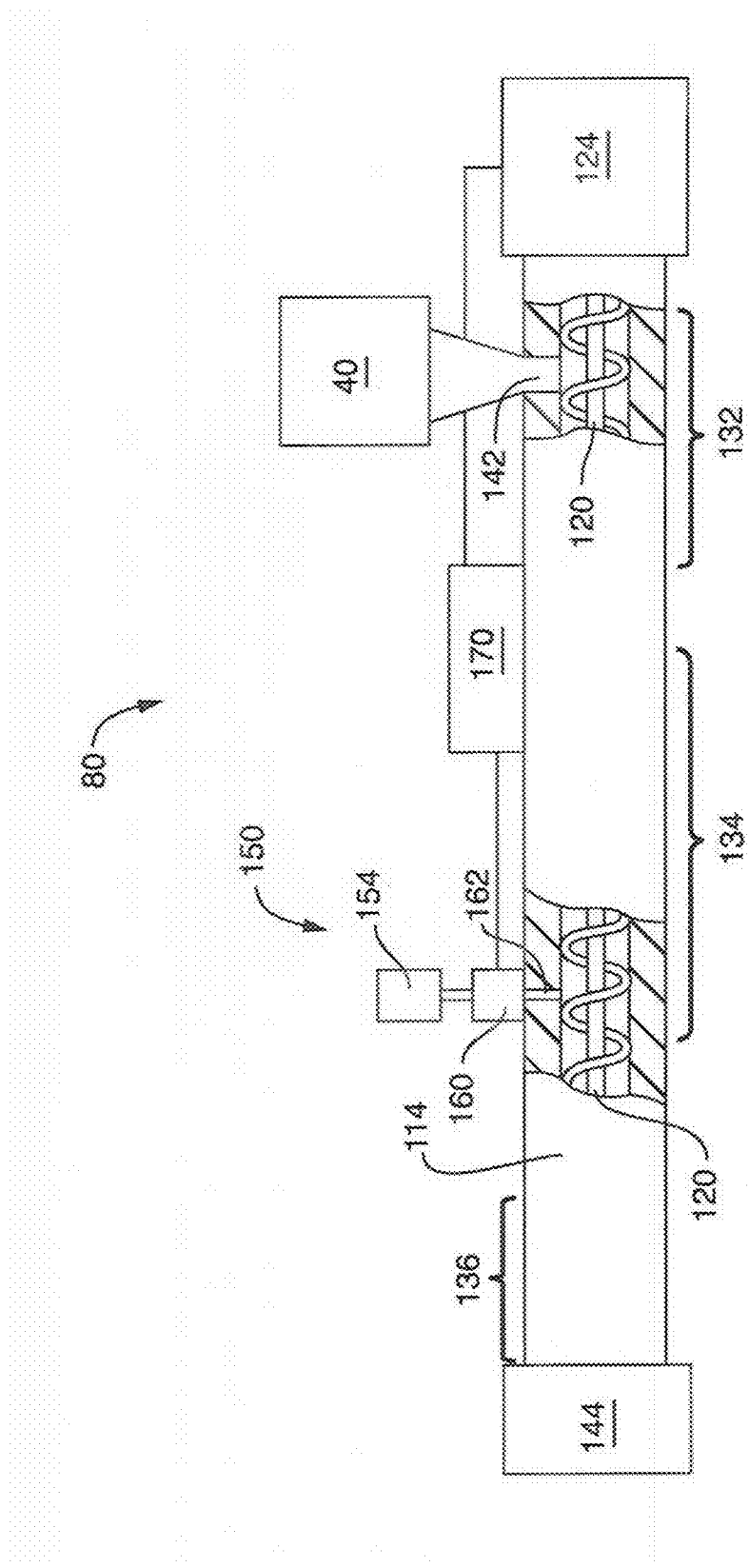
FIG. 12 is a partially broken away side view of an extruder that can be used in one aspect of the present disclosure.

Referring to FIG. 12, for example, one aspect of an extruder 80 that can be employed for the purposes of this disclosure is illustrated. As shown, the extruder 80 contains a housing or barrel 114 and a screw 120 (e.g., barrier screw) rotatably driven on one end by a suitable drive 124 (typically including a motor and gearbox). If desired, a twin-screw extruder can be employed that contains two separate screws. The extruder 80 generally contains three sections: the feed section 132, the melt section 134, and the mixing section 136. The feed section 132 is the input portion of the barrel 114 where the polymeric material is added. The melt section 134 is the phase change section in which the plastic material is changed from a solid to a liquid. The mixing section 136 is adjacent the output end of the barrel 114 and is the portion in which the liquid plastic material is completely mixed. While there is no precisely defined delineation of these sections when the extruder is manufactured, it is well within the ordinary skill of those in this art to reliably identify the melt section 134 of the extruder barrel 114 in which phase change from solid to liquid is occurring.

A hopper 40 is also located adjacent to the drive 124 for supplying the biopolymer, polyolefin, and/or other materials through an opening 142 in the barrel 114 to the feed section 132. Opposite the drive 124 is the output end 144 of the extruder 80, where extruded plastic is output for further processing to form a film, which will be described in more detail below. Although not required for this disclosure, a plasticizer supply station 150 is typically provided on the extruder barrel 114 that includes at least one hopper 154 attached to a pump 160 to selectively provide plasticizer through an opening 162 to the melt section 134. In this manner, plasticizer can be mixed with the polymers in a consistent and uniform manner. Of course, in addition to or in lieu of supplying the plasticizer to the melt section 134, it should also be understood that it can be supplied to other sections of the extruder, such as the feed section 132 and/or the mixing section 136. For example, in certain aspects where a plasticizer is necessary, the plasticizer can be directly injected into the hopper 40 along with other polymeric materials.

For applications in which a plasticizer is desired, the pump 160 can be a high pressure pump (e.g., positive displacement pump) with an injection valve so as to provide a steady selected amount of plasticizer to the barrel 114. If desired, a programmable logic controller 170 can also be employed to connect the drive 124 to the pump 160 so that it provides a selected volume of plasticizer based on the drive rate of the screw 120. That is, the controller 170 can control the rate of rotation of the drive screw 120 and the pump 160 to inject the plasticizer at a rate based on the screw rotation rate. Accordingly, if the rotation rate of the screw 120 is increased to drive greater amounts of plastic through the barrel 114 in a given unit of time, the pumping rate of the pump 160 can be similarly increased to pump proportionately greater amounts of plasticizer into the barrel 114.

The polymeric components can be processed within the extruder 80 under shear and pressure and heat to ensure sufficient mixing. For example, melt processing can occur at a temperature of from about 75° C. to about 280° C., in some aspects, from about 100° C. to about 250° C., and in some aspects, from about 150° C. to about 200° C. Likewise, the apparent shear rate during melt processing can range from about 100 seconds$^{-1}$ to about 10,000 seconds$^{-1}$, in some aspects from about 500 seconds$^{-1}$ to about 5000 seconds$^{-1}$, and in some aspects, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Once processed in the extruder, the melt blended composition can flow through a die to form an extrudate that is in the form of a strand, sheet, film, etc. If desired, the extrudate can be optionally cooled using any of a variety of techniques. In one aspect, for example, the extrudate is cooled upon exiting the die using a multi-stage system that includes at least one water-cooling stage and at least one air-cooling stage. For example, the extrudate can be initially contacted with water for a certain period time so that it becomes partially cooled. The actual temperature of the water and the total time that it is in contact with the extrudate can vary depending on the extrusion conditions, the size of the extrudate, etc. For example, the temperature of the water is typically from about 10° C. to about 60° C., in some aspects from about 15° C. to about 40° C., and in some aspects, from about 20° C. to about 30° C. Likewise, the total time that water is in contact with the extrudate (or residence time) is typically small, such as from about 1 to about 10 seconds, in some aspects from about 2 to about 8 seconds, and in some aspects from about 3 to about 6 seconds. If desired, multiple water cooling stages can be employed to achieve the desired degree of cooling. Regardless of the number of stages employed, the resulting water-cooled extrudate is typically at a temperature of from about 40° C. to about 100° C., in some aspects from about 50° C. to about 80° C., and in some aspects, from about 60° C. to about 70° C., and contains water in an amount of from about 2,000 to about 50,000 parts per million ("ppm"), in some aspects from about 4,000 to about 40,000 ppm, and in some aspects, from about 5,000 to about 30,000 ppm.

After the water-cooling stage(s), the extrudate is also subjected to at least one air-cooling stage in which a stream of air is placed into contact with the extrudate. The temperature of the air stream can vary depending on the temperature and moisture content of the water-cooled extrudate, but is typically from about 0° C. to about 40° C., in some aspects from about 5° C. to about 35° C., and in some aspects, from about 10° C. to about 30° C. If desired, multiple air-cooling stages can be employed to achieve the desired degree of cooling. Regardless of the number of stages employed, the total time that air is in contact with the extrudate (or residence time) is typically small, such as from about 1 to about 50 seconds, in some aspects from about 2 to about 40 seconds, and in some aspects, from about 3 to about 35 seconds. The resulting air-cooled extrudate is generally free of water and has a low moisture content, such as from about 500 to about 20,000 parts per million ("ppm") in some aspects from about 800 to about 15,000 ppm, and in some aspects, from about 1,000 to about 10,000 ppm. The temperature of the air-cooled extrudate can also be from about 15° C. to about 80° C., in some aspects from about 20° C. to about 70° C., and in some aspects from about 25° C. to about 60° C.

Figure 13:
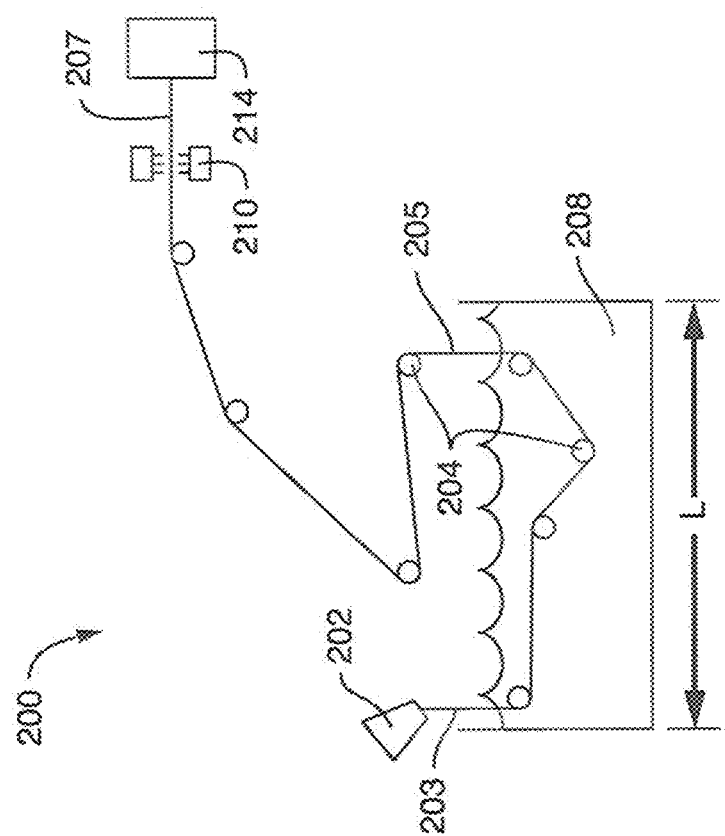
FIG. 13 is a schematic illustration of one aspect of a system for cooling the thermoplastic composition that can be employed in the present disclosure.

The specific configuration of the multi-stage cooling system can vary as would be understood by those skilled in the art. Referring to FIG. 13, for instance, one aspect of the cooling system 200 is shown in more detail. In this particular configuration, the cooling system 200 employs a single water-cooling stage that involves the use of a liquid water bath 208 and also a single air-cooling stage that involves the use of an air knife 210. It should be understood that various other cooling techniques can also be employed for each stage. For example, rather than a liquid bath, water can be sprayed, coated, etc. onto a surface of the extrudate. Likewise, other techniques for contacting the extrudate with an air stream can include blowers, ovens, etc. In any event, in the aspect illustrated in FIG. 13, the extrudate 203 is initially immersed within the water bath 208. As noted above, the rate of water cooling can be controlled by the temperature of the water bath 208 and the time that the extrudate 203 is immersed within the bath 208. In certain aspects, the residence time of the extrudate 203 within the bath 208 can be adjusted by controlling the speed of rollers 204 over which the extrudate 203 traverses. Furthermore, the length "L" of the water bath 208 can also be adjusted to help achieve the desired residence time. For example, the length of the bath 208 can range from about 1 to about 30 feet, in some aspects from about 2 to about 25 feet, and in some aspects, from about 5 to about 15 feet. Likewise, the length "$L_1$" of the water bath through which the extrudate 203 is actually immersed is typically from about 0.5 to about 25 feet, in some aspects from about 1 to about 20 feet, and in some aspects, from about 2 to about 12 feet. After passing through the bath 208 for the desired period of time, the resulting water-cooled extrudate 205 then traverses over a series of rollers until it is placed into contact with an air stream provided by the air knife 210. If desired, the air-cooled extrudate 207 can then pass through a pelletizer 214 to form pellets for subsequent processing into the film of the present disclosure. Alternatively, the air-cooled extrudate 207 can be processed into the film without first being formed into pellets.

Any known technique can be used to form a film from the blended and optionally cooled composition, including blowing, casting, flat die extruding, etc. In one particular aspect, the film can be formed by a blown process in which a gas (e.g., air) is used to expand a bubble of the extruded polymer blend through an annular die. The bubble is then collapsed and collected in flat film form. Processes for producing blown films are described, for instance, in U.S. Pat. No. 3,354,506 to Raley; U.S. Pat. No. 3,650,649 to Schippers; and U.S. Pat. No. 3,801,429 to Schrenk et al., as well as U.S. Patent Application Publication Nos. 2005/0245162 to McCormack, et al. and 2003/0068951 to Boggs, et al., all of which are incorporated herein in their entirety by reference thereto for all purposes. In yet another aspect, however, the film is formed using a casting technique.

Figure 14:
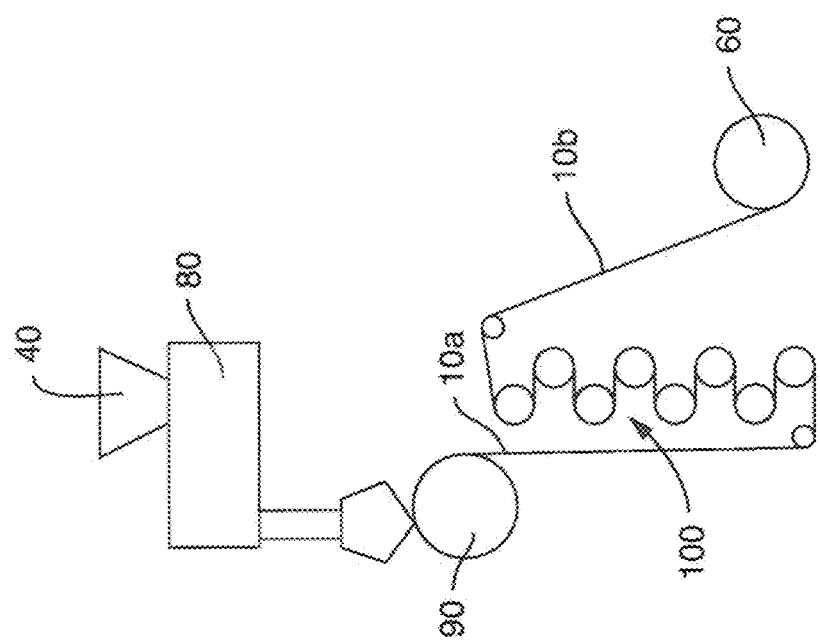
FIG. 14 is a schematic illustration of one aspect of a method for forming a film in accordance with the present disclosure.

Referring to FIG. 14, for instance, one aspect of a method for forming a cast film is shown. In this aspect, the raw materials (not shown) are supplied to the extruder 80 in the manner described above and shown in FIG. 12, and then cast onto a casting roll 90 to form a single-layered precursor film 10a. If a multilayered film is to be produced, the multiple layers are co-extruded together onto the casting roll 90. The casting roll 90 can optionally be provided with embossing elements to impart a pattern to the film. Typically, the casting roll 90 is kept at temperature sufficient to solidify and quench the sheet 10a as it is formed, such as from about 20 to 60° C. If desired, a vacuum box can be positioned adjacent to the casting roll 90 to help keep the precursor film 10a close to the surface of the roll 90. Additionally, air knives or electrostatic pinners can help force the precursor film 10a against the surface of the casting roll 90 as it moves around a spinning roll. An air knife is a device known in the art that focuses a stream of air at a very high flow rate to pin the edges of the film.

Once cast, the film 10a can then be optionally oriented in one or more directions to further improve film uniformity and reduce thickness. Orientation can also form micropores in a film containing fillers, thus providing breathability to the film. For example, the film can be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" oriented film can then be laminated to a fibrous web. In addition, the uniaxially oriented film can also be oriented in the cross-machine direction to form a "biaxially oriented" film. For example, the film can be clamped at its lateral edges by chain clips and conveyed into a tenter oven. In the tenter oven, the film can be reheated and drawn in the cross-machine direction to the desired draw ratio by chain clips diverged in their forward travel.

Referring again to FIG. 14, for instance, one method for forming a uniaxially oriented film is shown. As illustrated, the precursor film 10a is directed to a film-orientation unit 100 or machine direction orienter ("MDO"), such as commercially available from Marshall and Williams, Co. of Providence, R.I. The MDO has a plurality of stretching rolls (such as from 5 to 8) that progressively stretch and thin the film in the machine direction, which is the direction of travel of the film through the process as shown in FIG. 14. While the MDO 100 is illustrated with eight rolls, it should be understood that the number of rolls can be higher or lower, depending on the level of stretch that is desired and the degrees of stretching between each roll. The film can be stretched in either single or multiple discrete stretching operations. It should be noted that some of the rolls in an MDO apparatus might not be operating at progressively higher speeds. If desired, some of the rolls of the MDO 100 can act as preheat rolls. If present, these first few rolls heat the film 10a above room temperature (e.g., to 125° F.). The progressively faster speeds of adjacent rolls in the MDO act to stretch the film 10a. The rate at which the stretch rolls rotate determines the amount of stretch in the film and final film weight.

The resulting film 10b can then be wound and stored on a take-up roll 60. While not shown here, various additional potential processing and/or finishing steps known in the art, such as slitting, treating, aperturing, printing graphics, or lamination of the film with other layers (e.g., nonwoven web materials), can be performed without departing from the spirit and scope of the disclosure.

The film of the present disclosure can be mono- or multi-layered. Multilayer films can be prepared by co-extrusion of the layers, extrusion coating, or by any conventional layering process. For example, the film can contain from two (2) to fifteen (15) layers, and in some aspects, from three (3) to twelve (12) layers. Such multilayer films normally contain at least one base layer and at least one skin layer, but can contain any number of layers desired. For example, the multilayer film can be formed from a base layer and one or more skin layers, wherein the base layer is formed from the thermoplastic composition of the present disclosure. In most aspects, the skin layer(s) are formed from a thermoplastic composition such as described above. It should be understood, however, that other polymers can also be employed in the skin layer(s), such as polyolefin polymers (e.g., linear low-density polyethylene (LLDPE) or polypropylene).

The thickness of the film of the present disclosure can be relatively small to increase flexibility. For example, the film can have a thickness of about 50 micrometers or less, in some aspects from about 1 to about 40 micrometers, in some aspects from about 2 to about 35 micrometers, and in some aspects, from about 5 to about 30 micrometers. Despite having such a small thickness, the film of the present disclosure is nevertheless able to retain good mechanical properties during use. One parameter that is indicative of the relative dry strength of the film is the ultimate tensile strength, which is equal to the peak stress obtained in a stress-strain curve, such as obtained in accordance with ASTM Standard D638-08. Desirably, the film of the present disclosure exhibits a peak stress (when dry) in the machine direction ("MD") of from about 10 to about 100 Megapascals (MPa), in some aspects from about 15 to about 70 MPa, and in some aspects, from about 20 to about 60 MPa, and a peak stress in the cross-machine direction ("CD") of from about 2 to about 40 Megapascals (MPa), in some aspects from about 4 to about 40 MPa, and in some aspects, from about 5 to about 30 MPa.

Although possessing good strength, the film is relatively ductile. One parameter that is indicative of the ductility of the film is the percent strain of the film at its break point, as determined by the stress strain curve, such as obtained in accordance with ASTM Standard D608-08. For example, the percent strain at break of the film in the machine direction can be about 100% or more, in some aspects about 150% or more, and in some aspects, from about 200% to about 600%. Likewise, the percent strain at break of the film in the cross-machine direction can be about 200% or more, in some aspects about 250% or more, and in some aspects, from about 300% to about 800%. Another parameter that is indicative of ductility is the modulus of elasticity of the film, which is equal to the ratio of the tensile stress to the tensile strain and is determined from the slope of a stress-strain curve. For example, the film typically exhibits a modulus of elasticity (when dry) in the machine direction ("MD") of from about 10 to about 400 Megapascals ("MPa"), in some aspects from about 20 to about 200 MPa, and in some aspects, from about 40 to about 80 MPa, and a modulus in the cross-machine direction ("CD") of from about 10 to about 400 Megapascals ("MPa"), in some aspects from about 20 to about 200 MPa, and in some aspects, from about 40 to about 80 MPa.

The polymer blends produced by these processes can be converted into thin films. The films can be used as a component of personal care products such as outer cover films for baby diapers and child training pants, and baffle films for adult care and feminine care products. The films can also be adhesively bonded with nonwoven substrates to form laminates.

Several examples of the disclosure at different processing conditions and in different ratios of ingredients were made, as described below in the examples.

EXAMPLES

The following examples further describe and demonstrate aspects within the scope of the present disclosure. The examples are given solely for the purpose of illustration and are not to be construed as limitations of the present disclosure, as many variations thereof are possible without departing from the spirit and scope of the disclosure.

Materials Used in Examples
1. Cargill Gel Corn Starch, available from Cargill (Cedar Rapids, Iowa).
2. Glycerin, a processing aid, available from Cognis Corporation (Cincinnati, Ohio).
3. DOWLEX EG 2244G polyethylene resin, available from Dow Chemical Company (Midland, Mich.).
4. FUSABOND MB 528D, a chemically modified polyethylene resin, available from DuPont Company (Wilmington, Del.).
5. Braskem SLL318, bio-based polyethylene resin with a melt flow of 2.94 g/10 minutes at 190° C., available from Braskem Company (Brazil).
6. LOTADOR AX 8840, a random copolymer of ethylene and glycidyl methacrylate, available from Arkema (France).

Equipment Used in Examples

ZSK-30 Extruder: The Werner & Pfleiderer (W&P) ZSK-30 extruder is a modular twin screw compounder. It has a pair of co-rotating screws arranged in parallel. The center distance between the two shafts is 26.2 mm. The extruder has 14 processing barrels, with 13 heated barrels. Three barrels are open barrels on which injectors can be mounted. A vacuum port is located at barrel #12. The nominal screw diameters are 30 mm. The actual outer diameters of the screws are 30 mm and the inner screw diameters are 21.3 mm. The thread depth is 4.7 mm. The lengths of the screws are 1328 mm and the total processing section length is 1338 mm. The vacuum is generated by a water-ring pump connected with a separation tank and a condenser.

The Cargill Corn Starch was fed through a powder feeder. PE and a compatibilizer were fed through two pellet feeders, respectively. The glycerin was preheated to reduce viscosity to achieve proper feeding rate through the use of a pump. The attached pump system delivered the glycerin at required rates into zone 2 of the extruder. The feeding rates of materials are proportional to their composition ratios in the blends. The resultant TPS strands were cooled along a cooling belt including a mesh belt and a series of cooling fans. The cooled strand was then pelletized and collected for the following film processing.

HAAKE Extruder: The film processing was conducted on a HAAKE RHEOMEX 252p single screw extruder. The screw has a diameter of D=19.05 mm with an aspect ratio of L/D=25. A chill roll was used to cool the polymer as extruded from the cast film die and also to flatten it out to form a thin film. The screw speed was maintained at 60 rpm for films with standard thickness (1.2 mil) and 30 rpm for films with low thickness (0.7 mil). The four controlled temperature zones from the first heating zone to the die adaptor were set at 170, 175, 175, and 170° C., or 180, 185, 185, and 180° C. respectively, depending on the experimental objective. The pressure ranged from 29-37 bar and the torque ranged between 17-20 N·m. The chill roll settings were adjusted as needed to obtain films with constant dimension; additional gas cooling was set above the die. The residence time was ca. 1 min during extrusion. All samples were conditioned overnight at 23±2° C. and 50±5% RH prior to mechanical testing and characterizations.

Summary of Examples
1. Comparative example #1 (100% DOWLEX EG 2244G)
2. Comparative example #2 (100% Braskem SLL318)
3. Example #1—DOWLEX EG 2244G/TPS at 80:20 ratio+3% FUSABOND polymer
4. Example #2—DOWLEX EG 2244G/TPS at 60:40 ratio+3% FUSABOND polymer
5. Example #3—DOWLEX EG 2244G/TPS+10% $H_2O$ at 60:40 ratio+3% FUSABOND polymer
6. Example #4—DOWLEX EG 2244G/TPS at 40:60 ratio+3% FUSABOND polymer
7. Example #5—DOWLEX EG 2244G/TPS at 20:80 ratio+5% FUSABOND polymer
8. Example #6—DOWLEX EG 2244G/TPS at 60:40 ratio+3% LOTADOR copolymer
9. Example #7—Braskem SLL318/TPS at 60:40 ratio+3% FUSABOND polymer
10. Example #8—Braskem SLL318/TPS at 50:50 ratio+3% FUSABOND polymer
11. Example #9—Braskem SLL318/TPS at 45:55 ratio+3% FUSABOND polymer
12. Example #10—Braskem SLL318/TPS at 40:60 ratio+3% FUSABOND polymer
13. Example #11—Reprocessing of Braskem SLL318/TPS at 45:55 ratio and 40:60 ratio+3% FUSABOND polymer Comparative Example #1

The DOWLEX EG 2244G (hereinafter PE 2244) was processed on the HAAKE single screw extruder. A chill roll was used to cool the polymer as extruded from the cast film die and also to flatten it out to form a thin film. The screw speed was maintained at 60 rpm for all films with a standard thickness of 1.2 mils; lower screw speed at 30 rpm was also selected for thin films of 0.7 mils. The four controlled temperature zones from the first heating zone to the die adaptor were set at 170, 175, 175, and 175° C., respectively. The residence time was approximately 1 min during extrusion. The extruded film had a universal dimension of (5.2 inch×1.3 mil) with additional air knife above the die. All samples were conditioned overnight at 23±2° C. and 50±5% RH prior to mechanical testing and characterizations.

Comparative Example #2

Same as Comparative Example #1, but with the PE 2244 changed to Braskem SLL318 (hereinafter green PE).

Example #1

The PE2244, FUSABOND polymer, corn starch, and glycerin were compounded at a 77:3:15:5 w/w ratio on the ZSK-30 twin screw extruder. Glycerin was pumped directly into the melt-stream (barrel 2) of the extruder using a three head liquid pump at approximately 18.9 g/min., equating to the necessary 2.5 lbs/hr. The processing temperatures along the 7-zone extruder were set at the following: 90,140,165, 165,165,150, and 145° C. The melt temperature and pressure were 174° C. and 100-240 psi, respectively. Torque varied throughout the trial from 60-80% of maximum. Compounded pellets were further processed into films on the HAAKE single screw extruder, as described in Comparative Example #1. However, the film surface is not smooth; un-melted starch granulates could be seen distributed within the films (FIG. 1).

FIG. 1a illustrates the smooth appearance and quality of PE/TPS (60/40 w/w) blend films. FIG. 1b illustrates the appearance and quality of PE2244/TPS (80/20 w/w) blend films.

Example #2 and Example #3

Figures 2A, 2B:
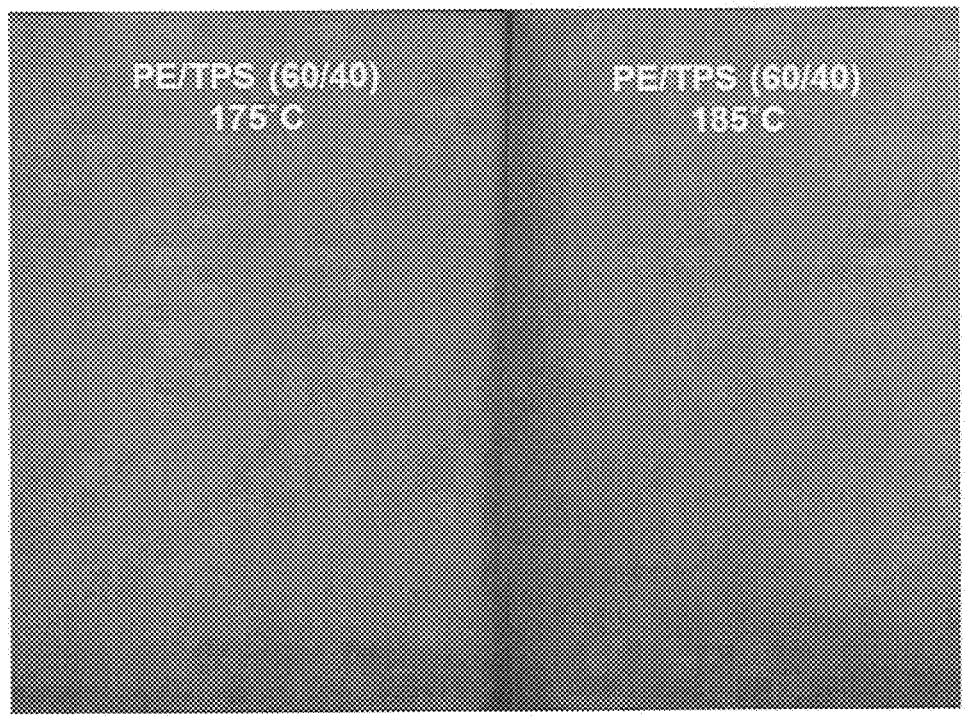
FIG. 2A illustrates the effect of processing temperature on the appearance and color of PE/TPS (60/40 w/w) blend film processed at 175° C.
FIG. 2B illustrates the effect of processing temperature on the appearance and color of PE/TPS (60/40 w/w) blend film processed at 175° C.
Figure 3A:
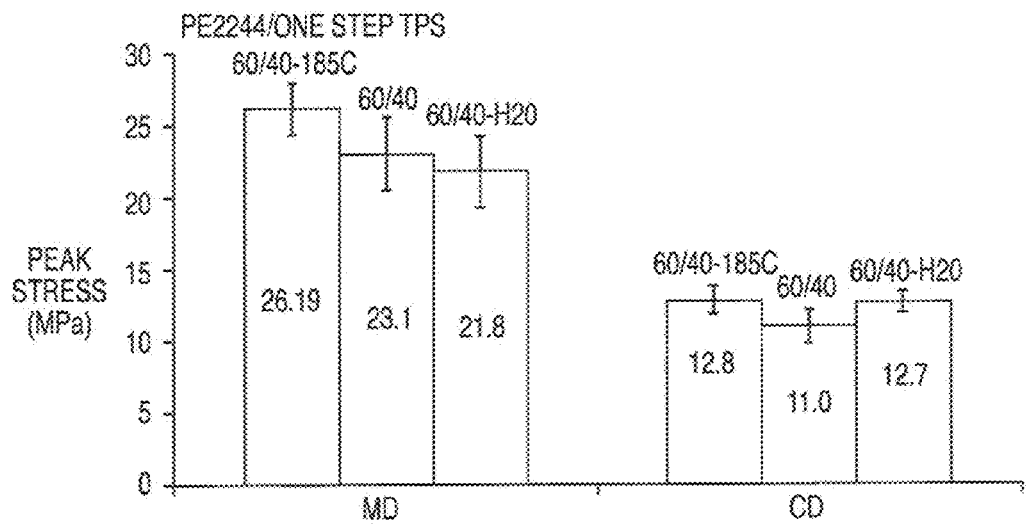
FIG. 3A illustrates the peak stress mechanical properties of the films produced in Examples #2 and #3.
Figure 3B:
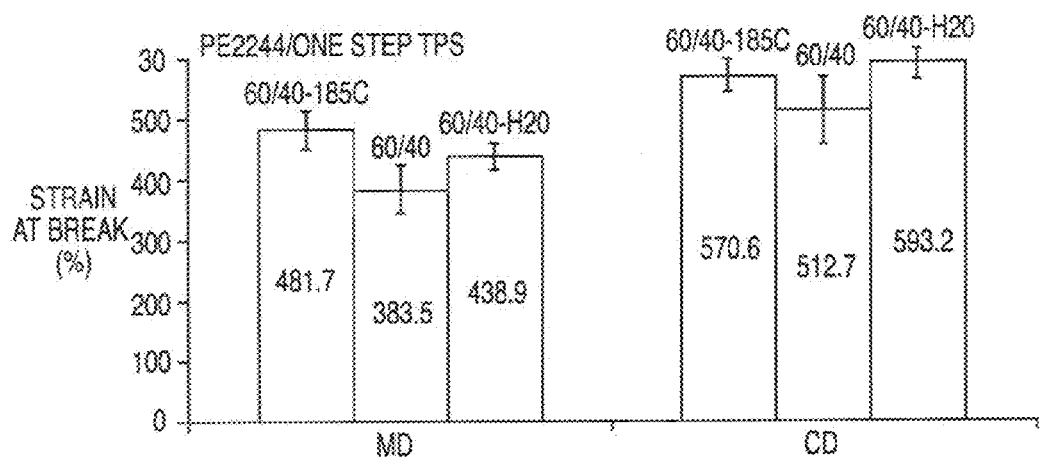
FIG. 3B illustrates the strain at break mechanical properties of the films produced in Examples #2 and #3.
Figure 3C:
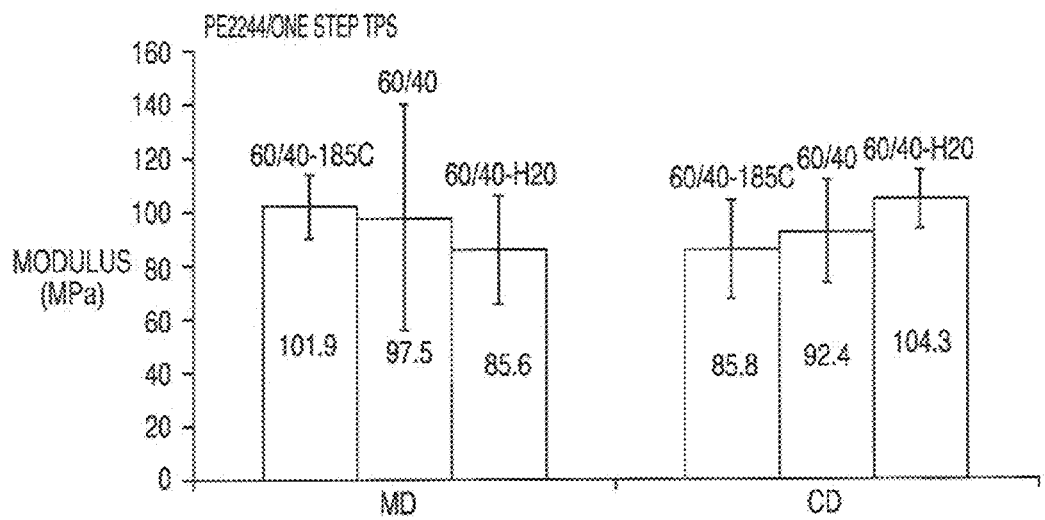
FIG. 3C illustrates the modulus mechanical properties of the films produced in Examples #2 and #3.
Figure 3D:
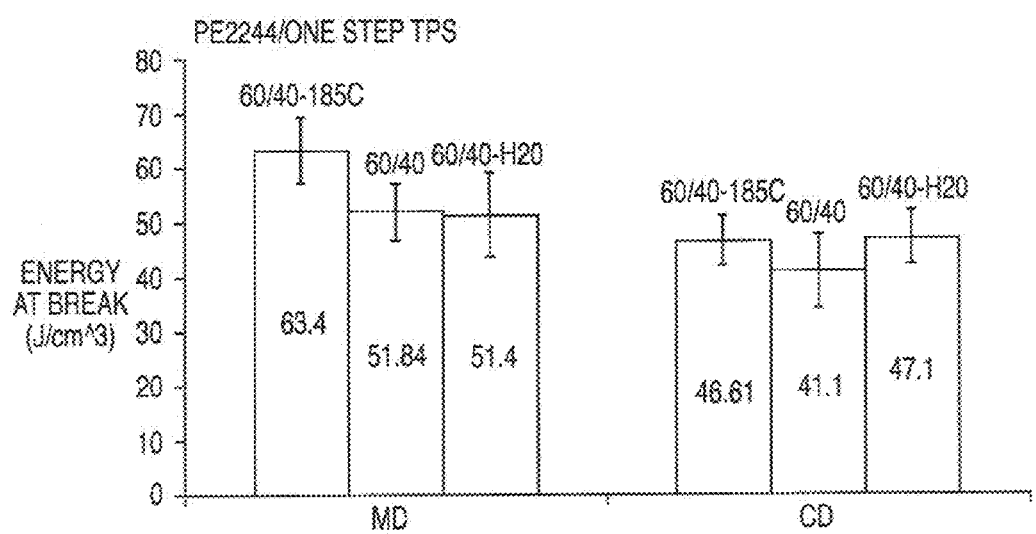
FIG. 3D illustrates the energy at break mechanical properties of the films produced in Examples #2 and #3.
Figure 4A:
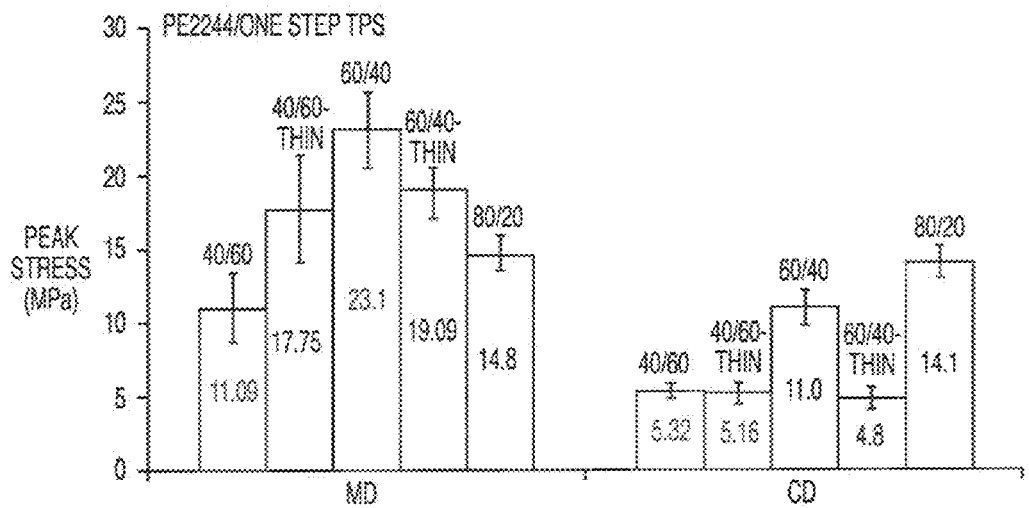
FIG. 4A illustrates the peak stress mechanical properties of the films produced in Example #4.
Figure 4B:
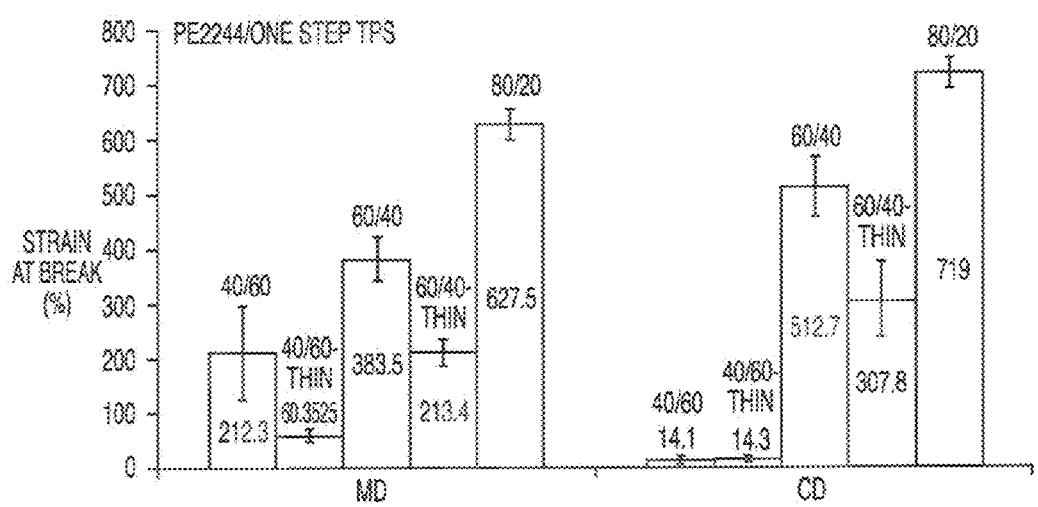
FIG. 4B illustrates the strain at break mechanical properties of the films produced in Example #4.
Figure 4C:
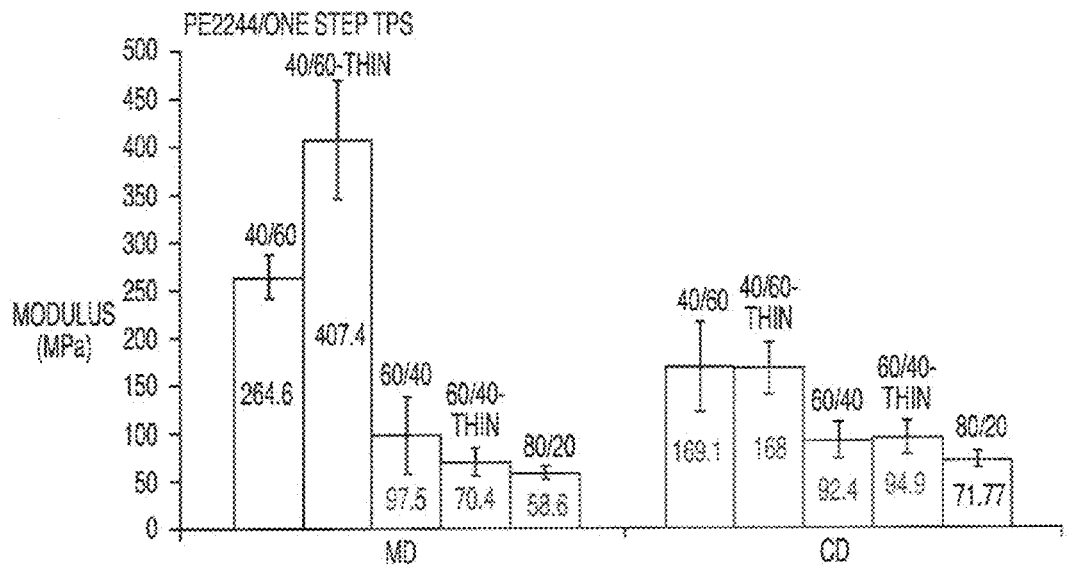
FIG. 4C illustrates the modulus mechanical properties of the films produced in Example #4.
Figure 4D:
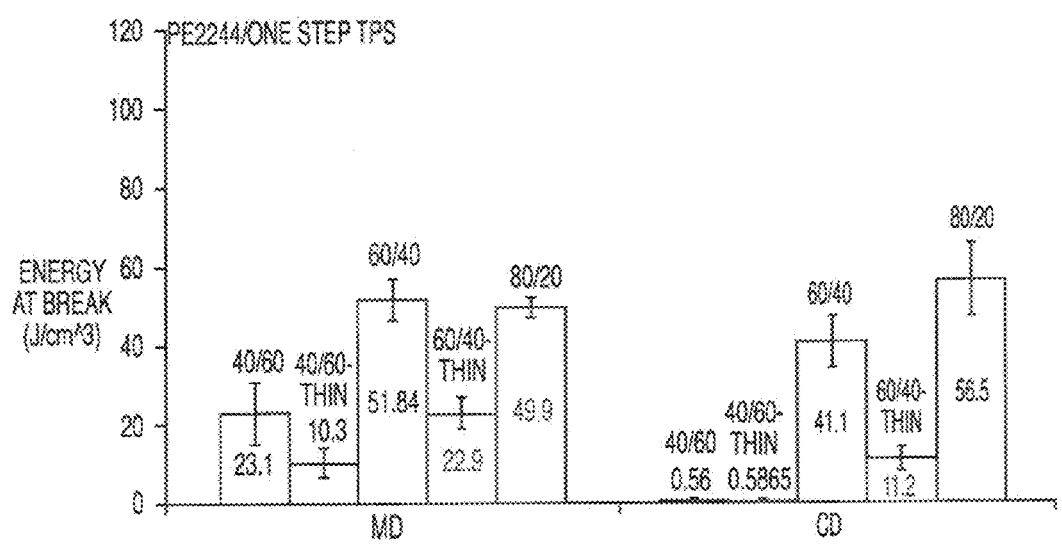
FIG. 4D illustrates the energy at break mechanical properties of the films produced in Example #4.

The PE2244, FUSABOND polymer, corn starch, and glycerin were compounded at a 57:3:30:10 w/w ratio on the ZSK-30 twin screw extruder. Processing and parameters were same as those in Example #1. The resultant film surface is soft and smooth due to the sufficient plasticization and shear stress during compounding, as illustrated in FIG. 2a. Two additional trials were conducted with the same composition. In the first (Example #2), the film processing temperature was increased by 10° C. The pelletized compounds were fed into the HAAKE single screw extruder, with the four controlled temperature zones changed from 170, 175, 175, and 175° C. to 180, 185, 185, and 185° C., respectively. The resultant film is also soft and smooth (see FIG. 2b), while darker compared with the film at lower processing temperature. The change in color is most likely due to more thermal degradation of TPS at 185° C. On the other hand, the mechanical properties of such film were improved, as can be seen in FIG. 3.

In the second, water was incorporated as plasticizer during extrusion (Example #3). 10 wt % $H_2O$ based on native corn starch was added into weighed corn starch and mixed thoroughly using a kitchen blender. The water was added for better gelation and flowability of the starch, and to soften the starch granulates. The water-plasticized, corn starch was kept overnight in a sealed zipper bag to allow it stabilize. Such modified starch was designated as "TPS-$H_2O$." The PE2244, FUSABOND polymer, TPS-$H_2O$, and glycerin were compounded at a 57:3:30:10 w/w ratio on the ZSK-30 twin screw extruder. The processing and parameters were same as Example #2. The resultant film has the same quality and appearance as Example #2 at lower processing temperature, with the mechanical properties somewhat increased (see FIG. 3).

FIG. 3 illustrates the results of testing the mechanical properties of PE2244/TPS (60/40 w/w) blend films under three different conditions: 1) processing temperature of 185° C., 2) processing temperature of 175° C., and 3) starch formulated with water before extrusion. Graph a of FIG. 3 illustrates Peak Stress; graph b of FIG. 3 illustrates Strain at Break; graph c of FIG. 3 illustrates Elastic Modulus; and graph d of FIG. 3 illustrates Energy per Volume at break.

Example #4

The PE2244, FUSABOND polymer, corn starch, and glycerin were compounded at a 37:3:45:15 w/w ratio on the ZSK-30 twin screw extruder; processing and parameters were the same as those in Example #1. The resultant film surface is smooth; the softness of the film depends on the thickness: the film is soft when the thickness is low (e.g., ~0.8 mil), but the film is rigid when the thickness is standard (e.g., ~1.2 mil). This difference is due to the brittle nature of corn starch. Thin films are studied to obtain products with required mechanical properties and with lower material consumption.

The comparison of mechanical properties of films with different compositions is shown in FIG. 4. The different compositions are: PE2244/TPS (40/60 w/w), PE2244/TPS (60/40 w/w), and PE2244/TPS (80/20 w/w). The label "thin" refers to the extruded film with low thickness (~0.8 mil), which is obtained by speeding up the chill roll drawing. Graph a of FIG. 4 illustrates Peak Stress; graph b of FIG. 4 illustrates Strain at Break; graph c of FIG. 4 illustrates Elastic Modulus; and graph d of FIG. 4 illustrates Energy per Volume at break. It can be seen that the film with best ratio of performance-over-cost is PE2244/TPS (60/40 w/w).

Example #5

Figure 5:
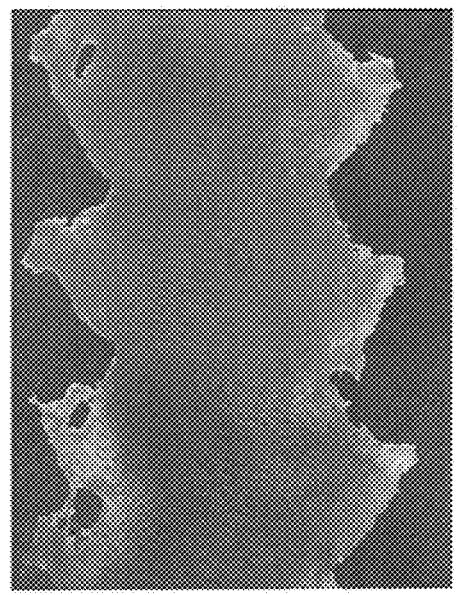
FIG. 5 illustrates the appearance of PE/TPS (20/80w/w) film showing the low processability at high TPS content.

The PE2244, FUSABOND polymer, corn starch, and glycerin were compounded at a 15:5:60:20 w/w ratio on the ZSK-30 twin screw extruder. The processing and parameters were the same as those in Example #1. However, film with such a high TPS content was not successfully extruded due to the low melt strength of the blend. Several other trials were conducted to improve the flowability and melt strength of the blend. 1) The ratio of glycerol to starch was increased from 1:3 to 1:2. Film with such formulation was obtained; however, the film is very rigid and thick. 2) The ratio of glycerol to starch was increased from 1:3 to 1:1. The compounded strand from such formulation was very elastic and gummy, and was not conducive to chopping for film processing. 3) 2% citric acid was introduced into the pre-compounding starch to reduce its viscosity and improve flowability. However, no obvious improvements were observed. FIG. 5 illustrates the appearance of PE2244/TPS (20/80w/w) film, showing the low processability at high TPS content. The ratio of glycerol to starch is 1:2.

Example #6

Figures 6A, 6B:
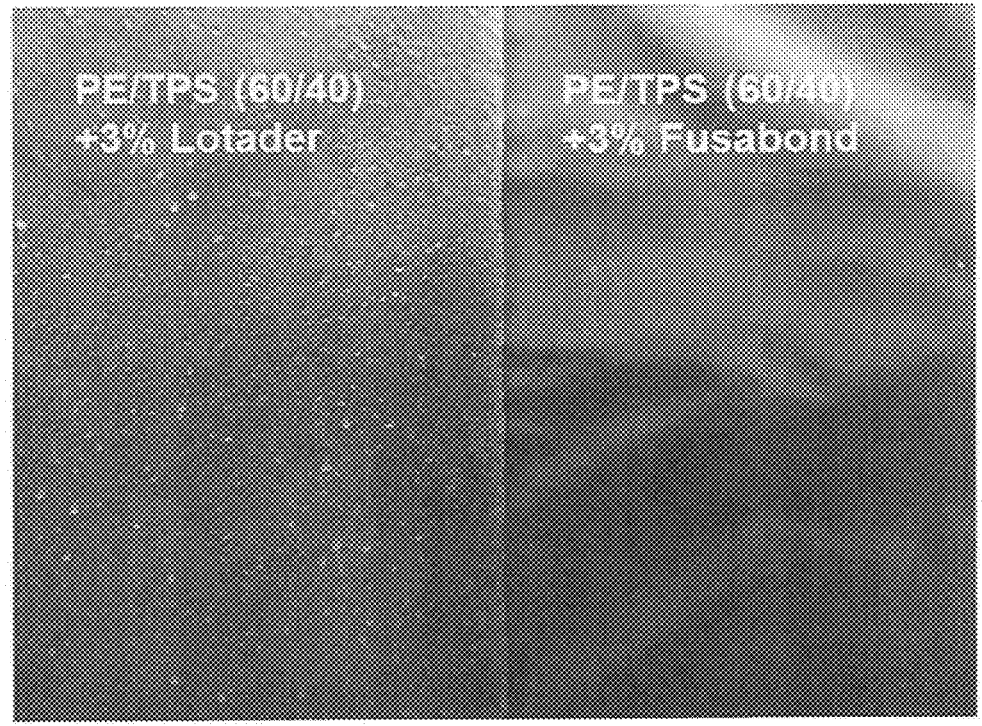
FIGS. 6A and 6B illustrate a comparison of film appearances using LOTADOR copolymer (FIG. 6A) and FUSABOND polymer (FIG. 6B) as compatibilizers.
Figure 7A:
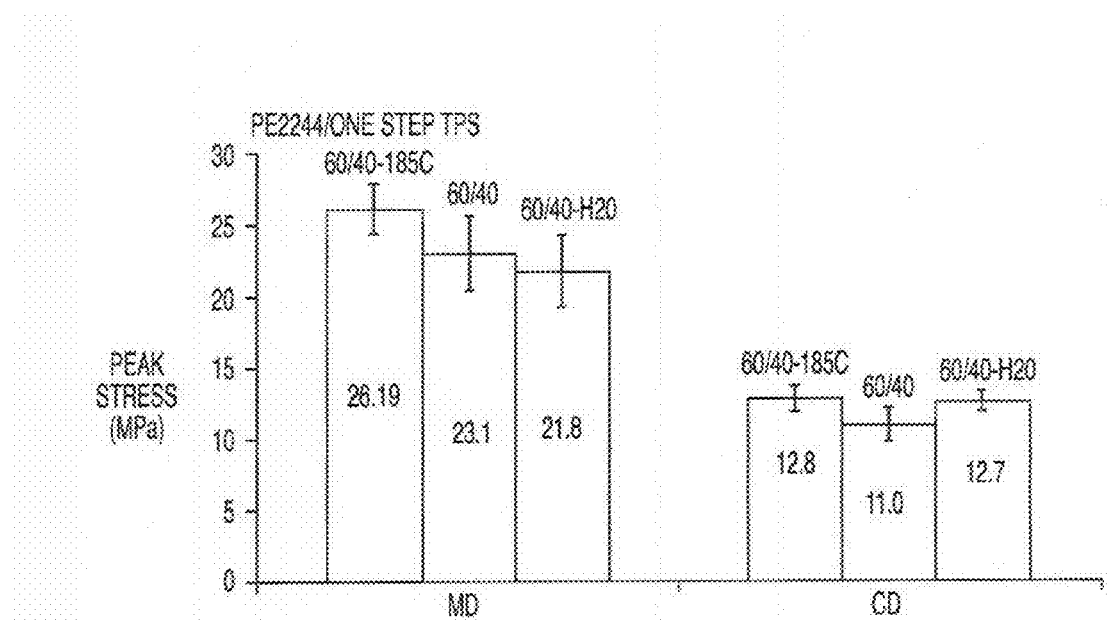
FIG. 7A illustrates the peak stress mechanical properties of the films produced in Example #7.
Figure 7B:
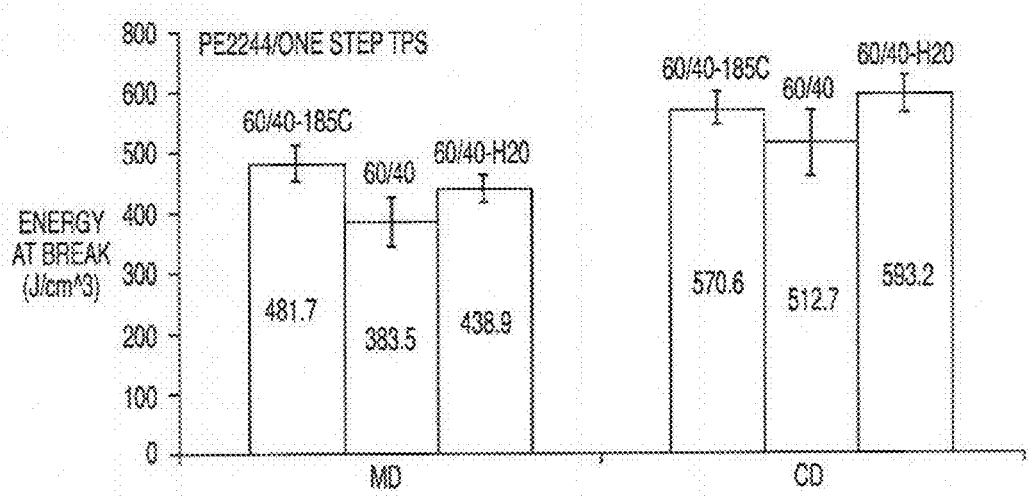
FIG. 7B illustrates the strain at break mechanical properties of the films produced in Example #7.
Figure 7C:
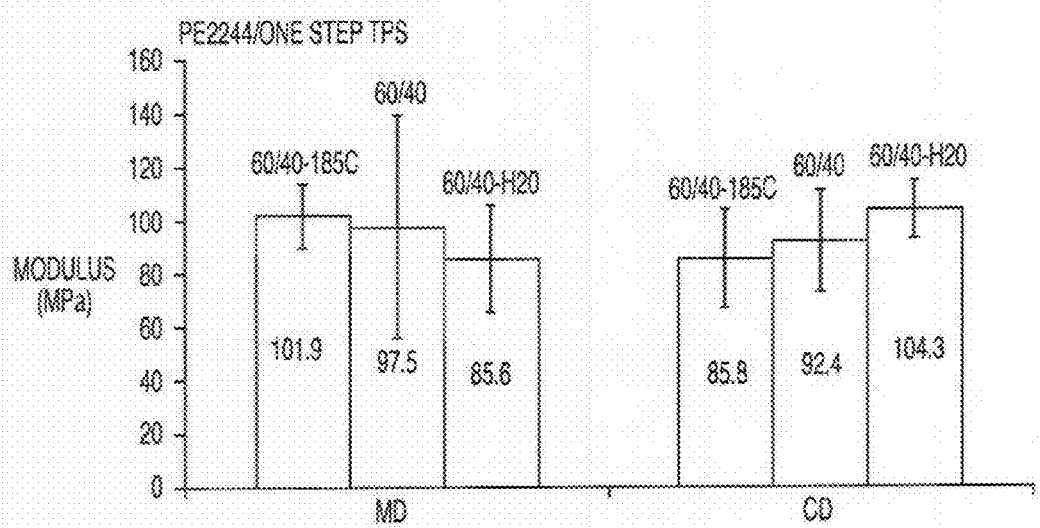
FIG. 7C illustrates the modulus mechanical properties of the films produced in Example #7.
Figure 7D:
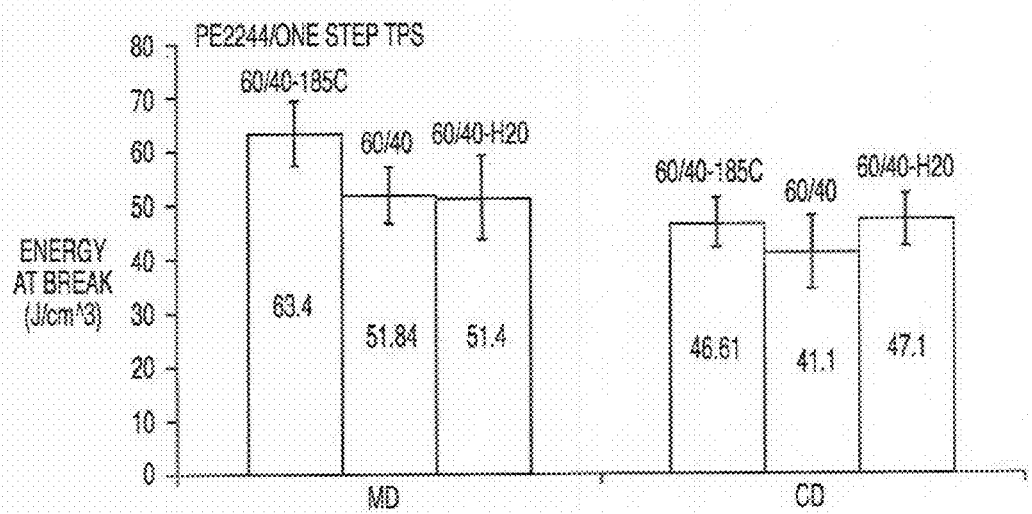
FIG. 7D illustrates the energy at break mechanical properties of the films produced in Example #7.
Figure 8A:
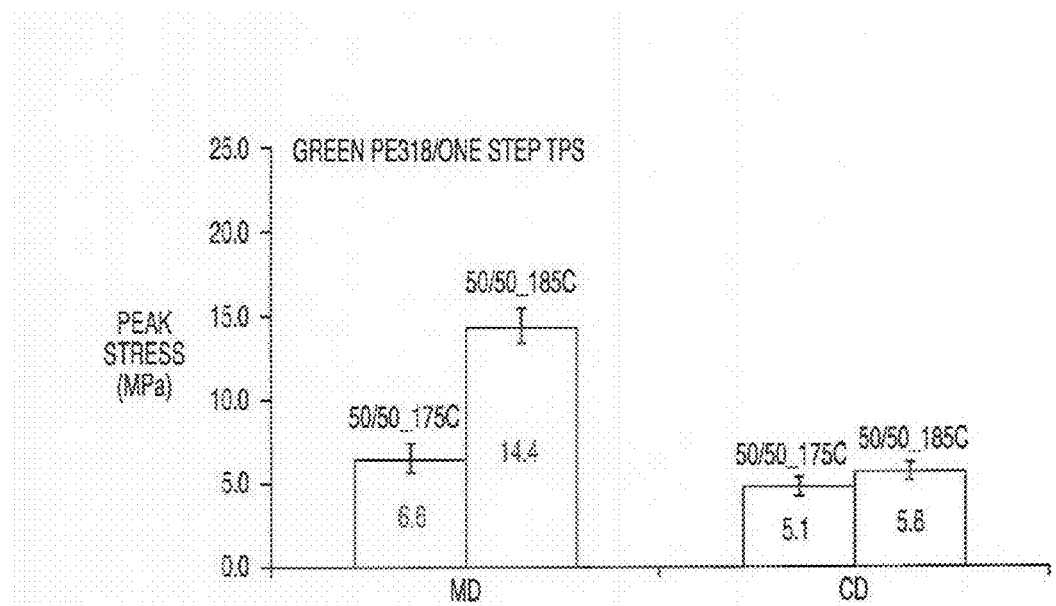
FIG. 8A illustrates the peak stress mechanical properties of the films produced in Example #8.
Figure 8B:
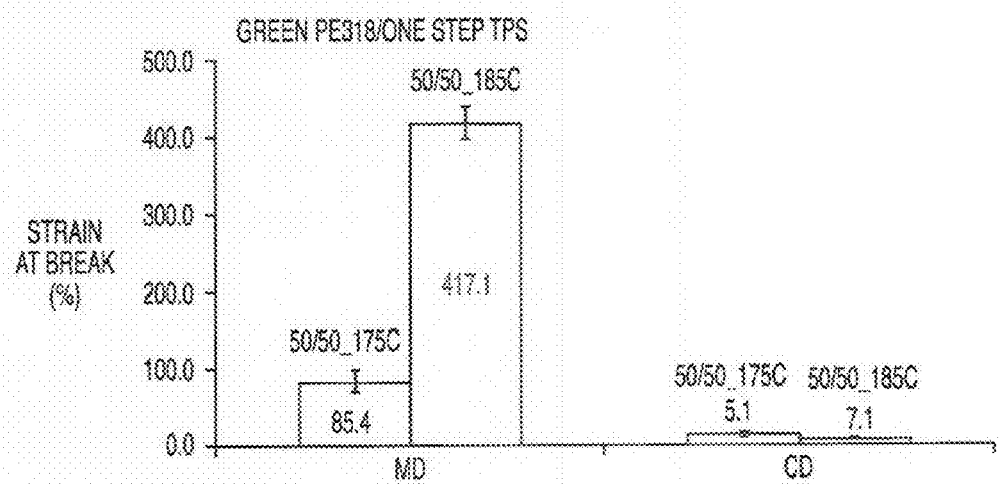
FIG. 8B illustrates the strain at break mechanical properties of the films produced in Example #8.
Figure 8C:
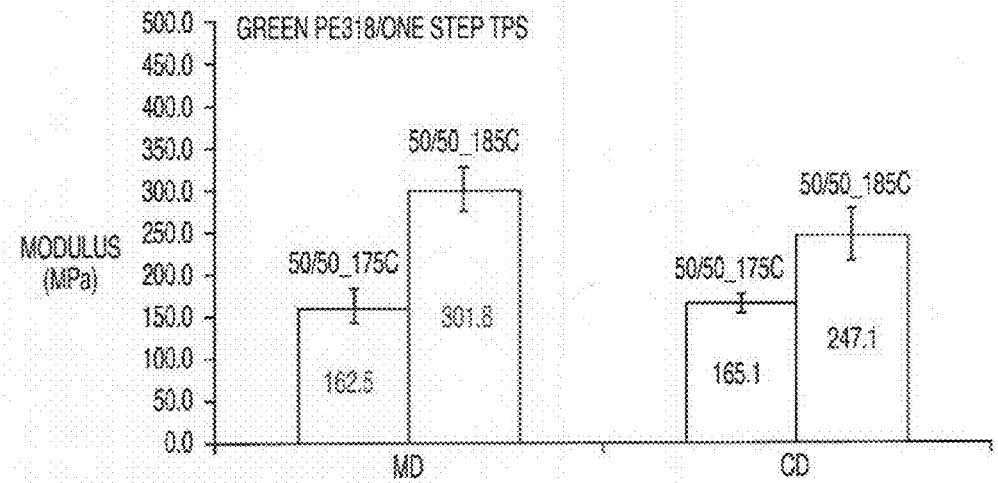
FIG. 8C illustrates the modulus mechanical properties of the films produced in Example #8.
Figure 8D:
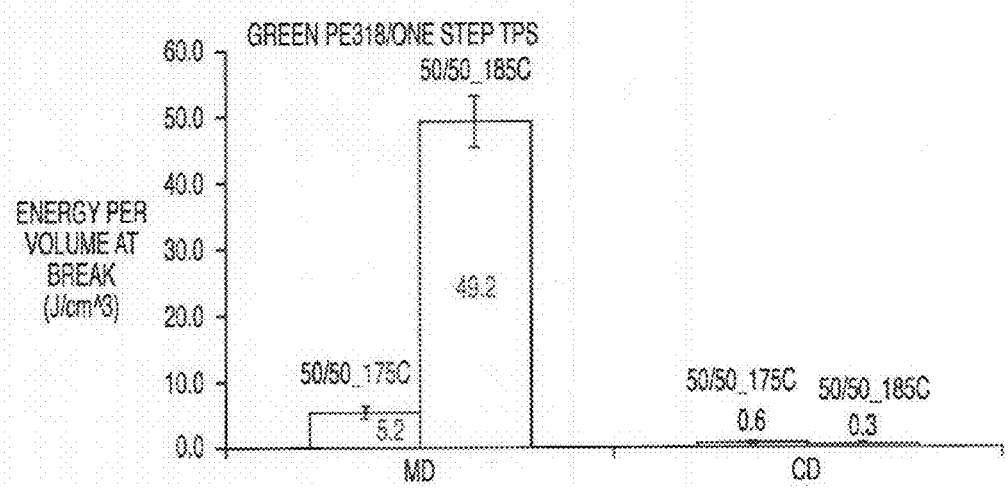
FIG. 8D illustrates the energy at break mechanical properties of the films produced in Example #8.
Figure 9A:
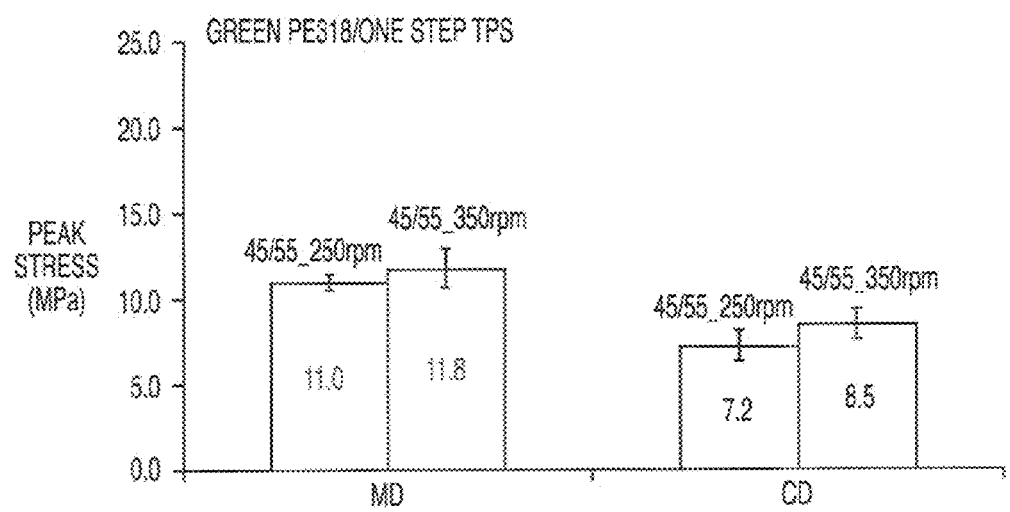
FIG. 9A illustrates the peak stress mechanical properties of the films produced in Example #9.
Figure 9B:
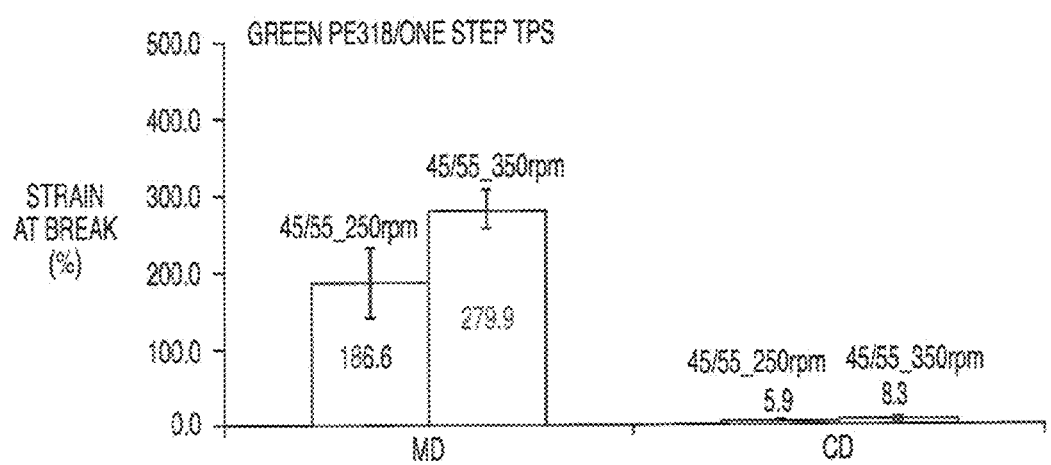
FIG. 9B illustrates the strain at break mechanical properties of the films produced in Example #9.
Figure 9C:
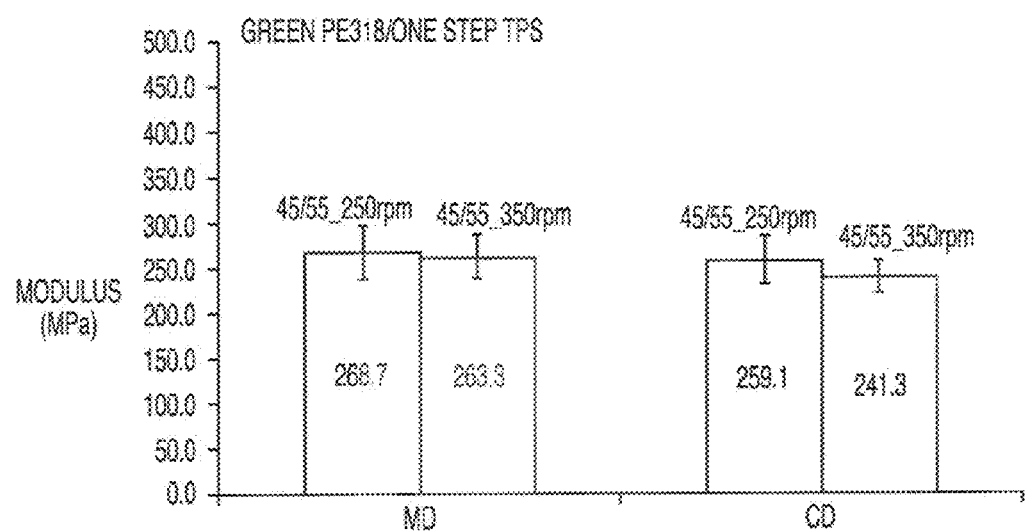
FIG. 9C illustrates the modulus mechanical properties of the films produced in Example #9.
Figure 9D:
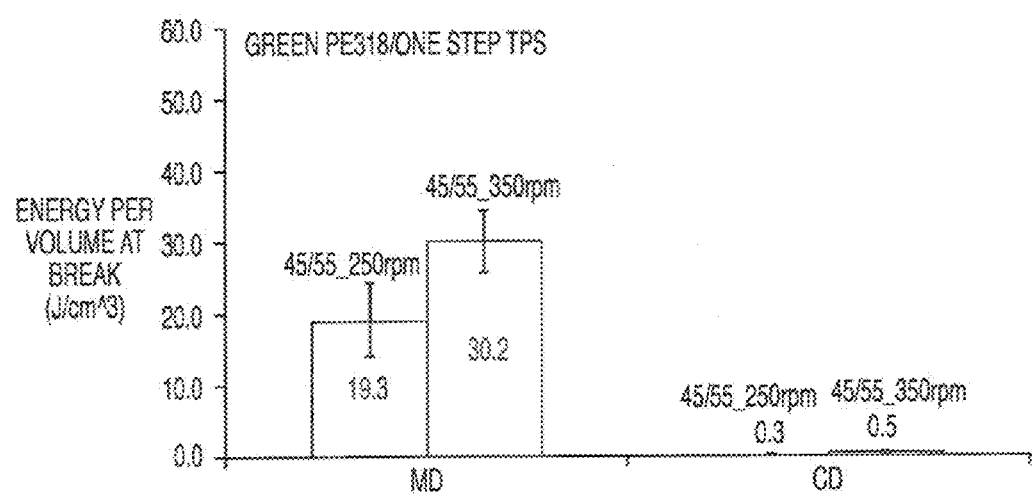
FIG. 9D illustrates the energy at break mechanical properties of the films produced in Example #9.
Figure 10A:
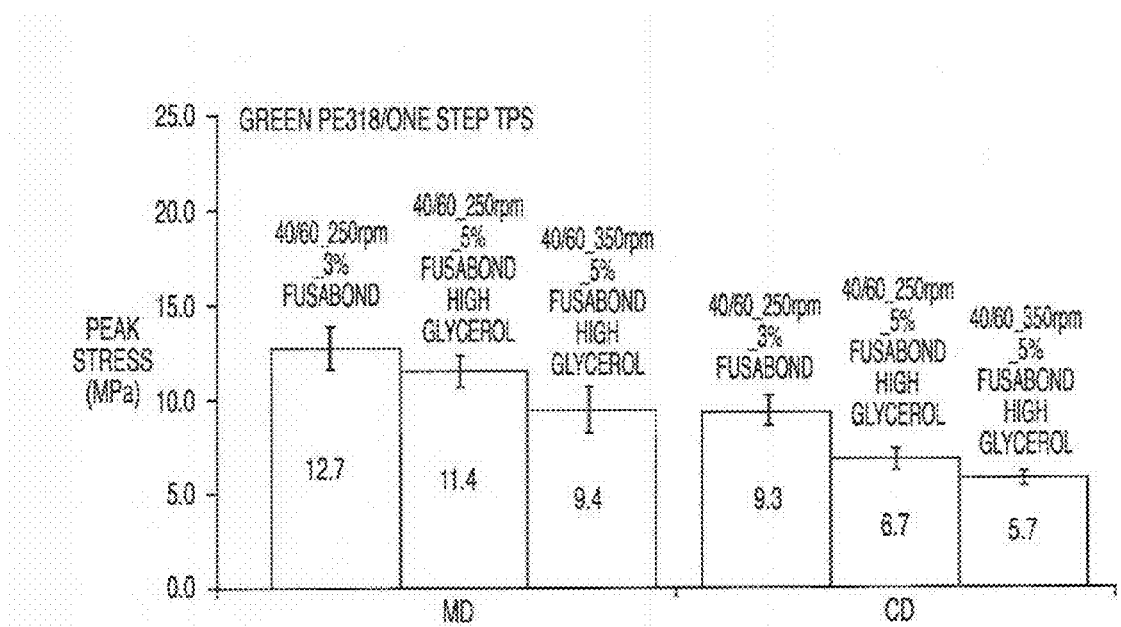
FIG. 10A illustrates the peak stress mechanical properties of the films produced in Example #10.
Figure 10B:
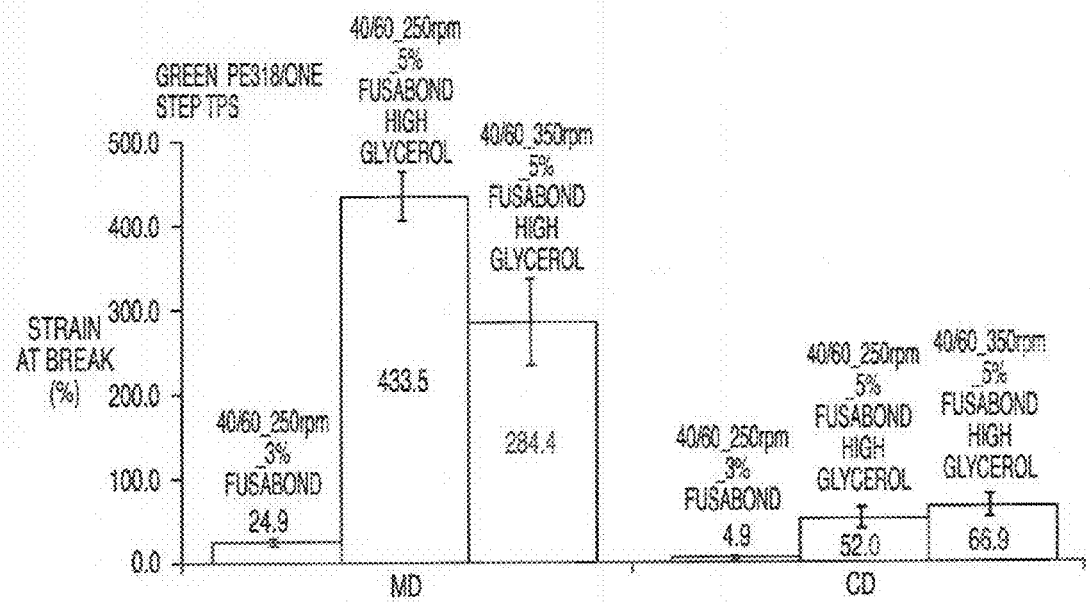
FIG. 10B illustrates the strain at break mechanical properties of the films produced in Example #10.
Figure 10C:
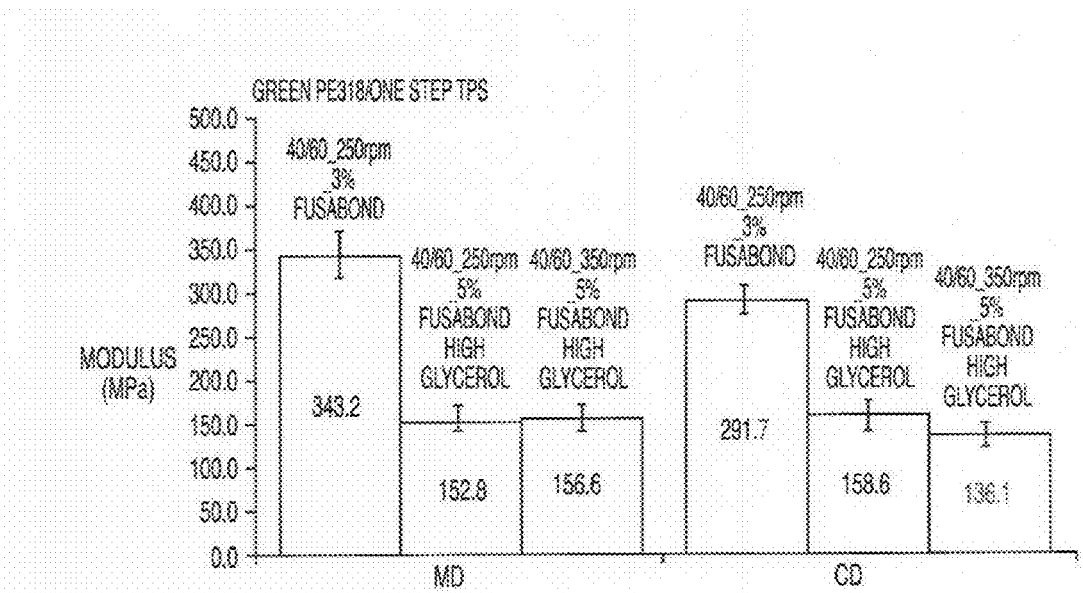
FIG. 10C illustrates the modulus mechanical properties of the films produced in Example #10.
Figure 10D:
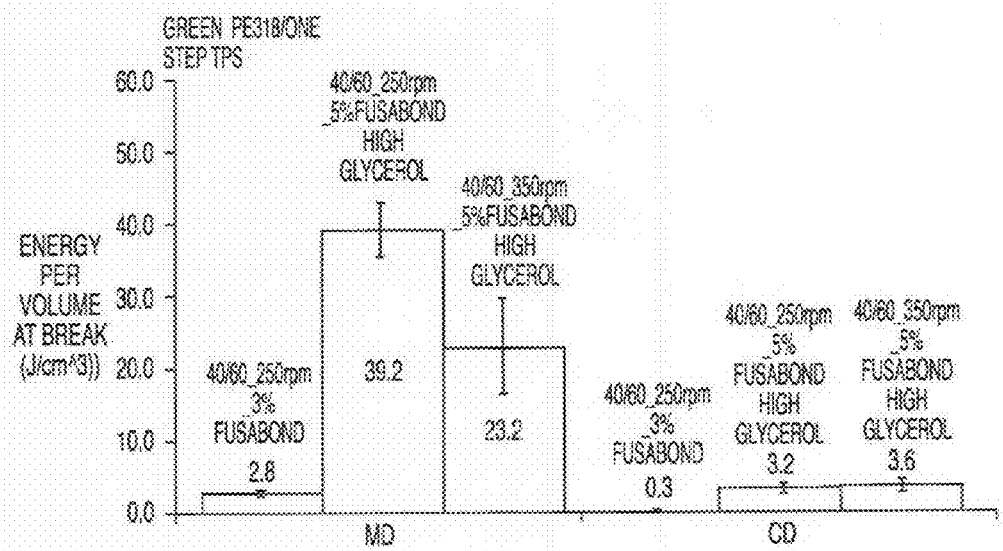
FIG. 10D illustrates the energy at break mechanical properties of the films produced in Example #10.
Figure 11A:
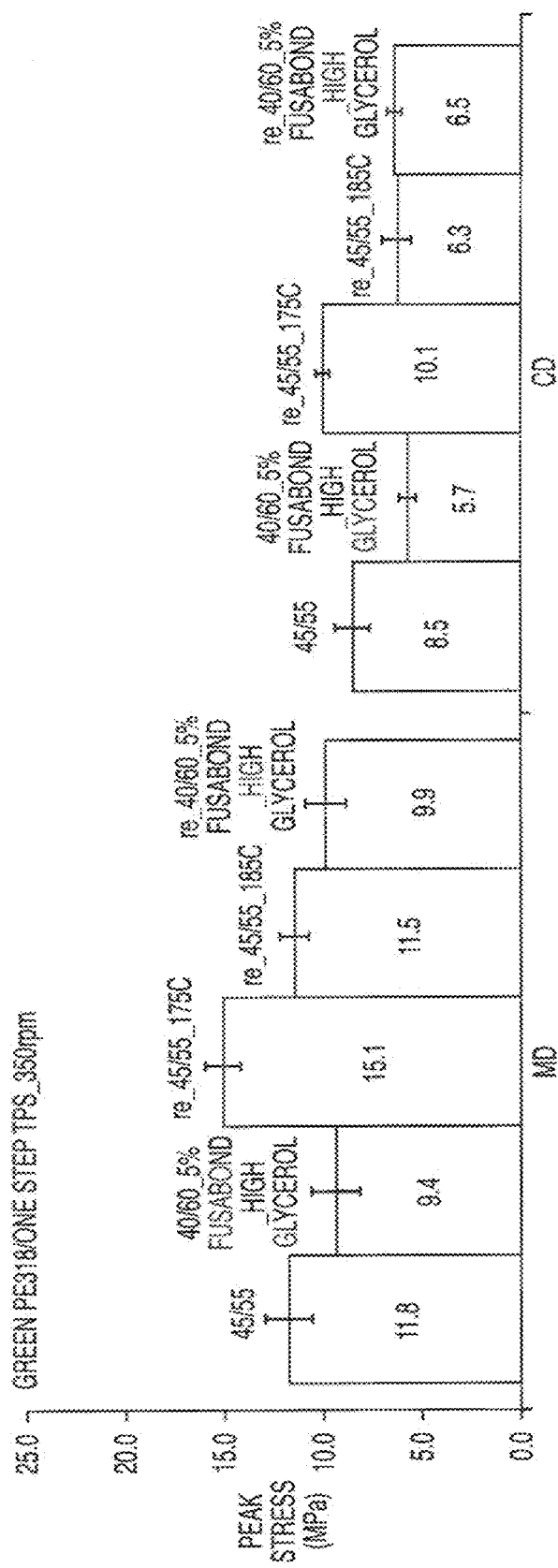
FIG. 11A illustrates the peak stress mechanical properties of the films produced in Example #11.
Figure 11B:
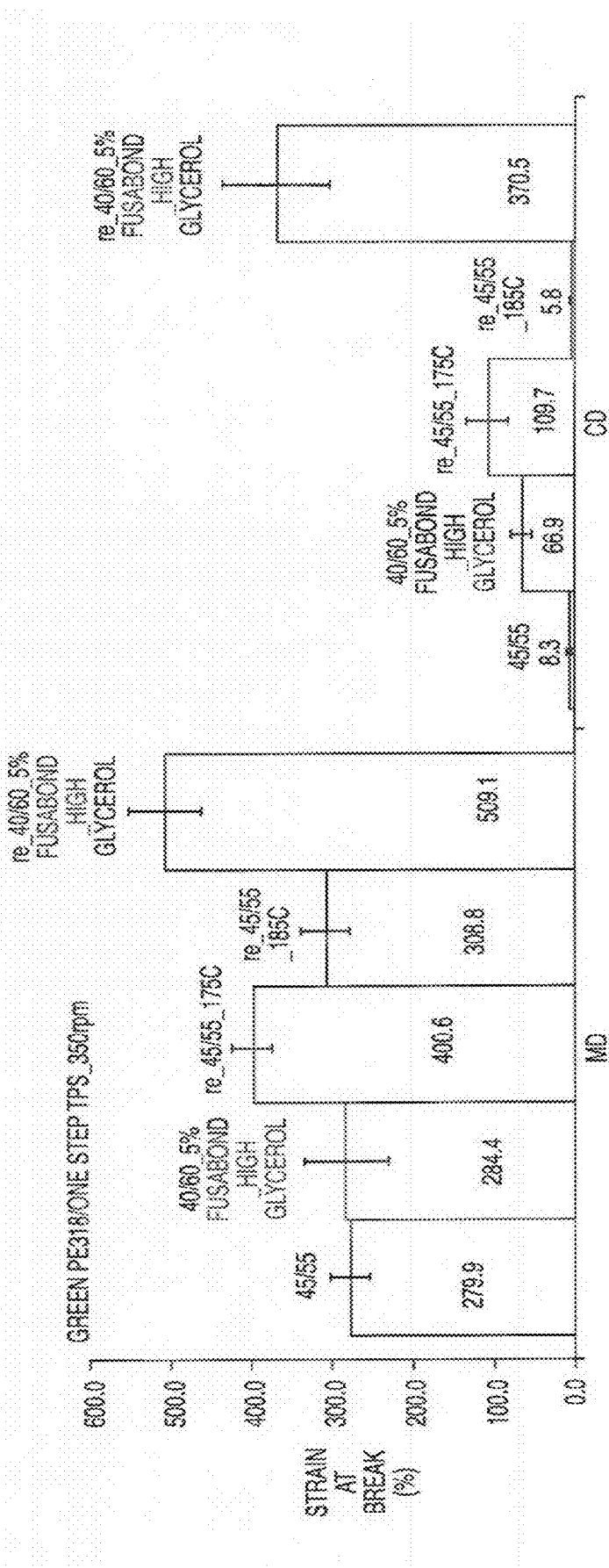
FIG. 11B illustrates the strain at break mechanical properties of the films produced in Example #11.
Figure 11C:
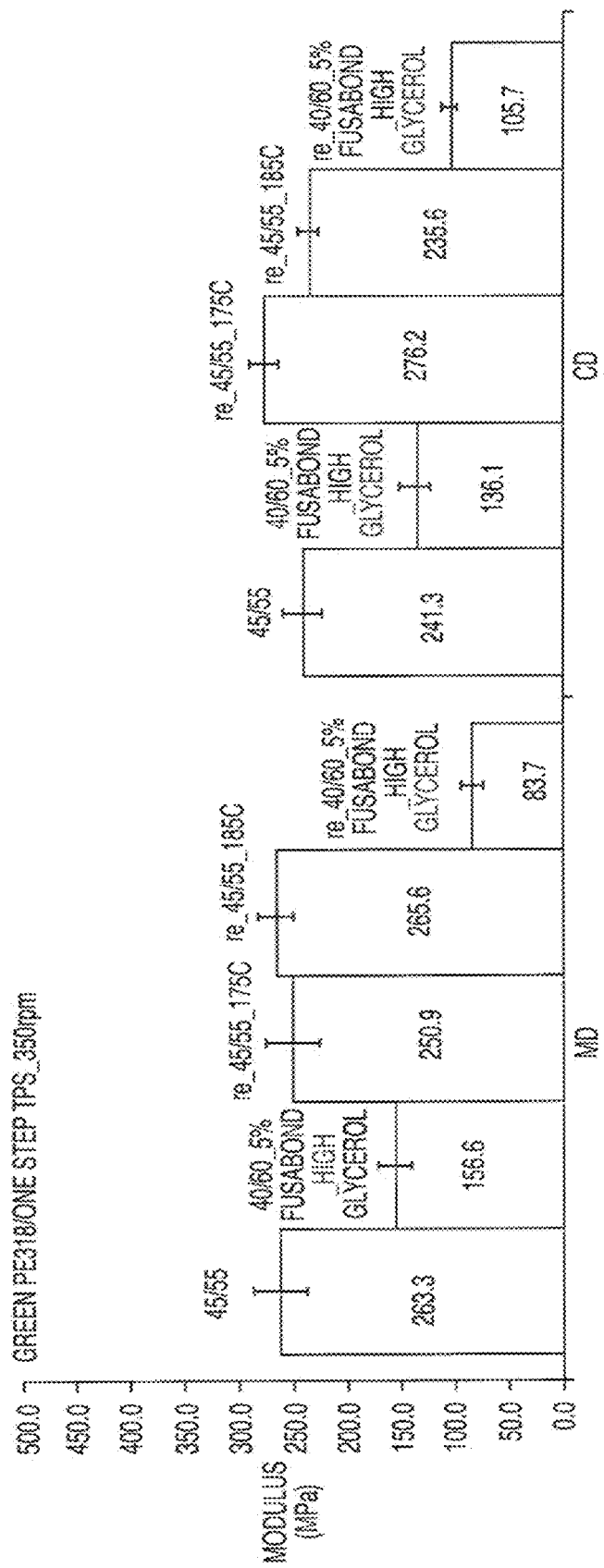
FIG. 11C illustrates the modulus mechanical properties of the films produced in Example #11.
Figure 11D:
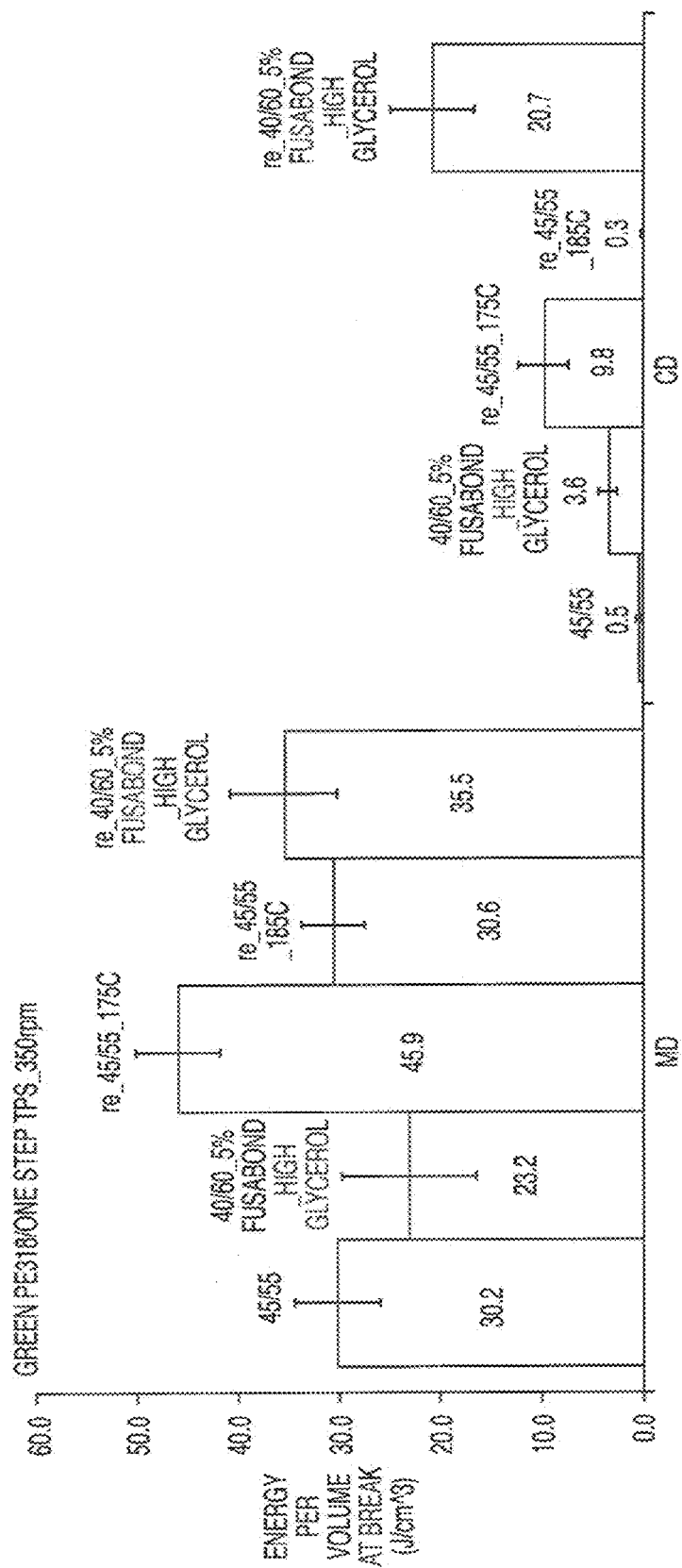
FIG. 11D illustrates the energy at break mechanical properties of the films produced in Example #11.

The PE2244, LOTADOR copolymer, corn starch, and glycerin were compounded at a 57:3:30:10 w/w ratio on the ZSK-30 twin screw extruder. Processing and parameters were the same as those in Example #2. The resultant film surface is rough with un-melted starch granulates (see FIG. 6a) due to insufficient compatibilization, suggesting the inferior compatibilizing effect of LOTADOR copolymer compared with FUSABOND polymer in this particular use. FIGS. 6a and 6b illustrate a comparison of film appearances using LOTADOR copolymer and FUSABOND polymer as compatibilizers, respectively.

Example #7

The green PE, FUSABOND polymer, corn starch, and glycerin were compounded at a 57:3:30:10 w/w ratio on the ZSK-30 twin screw extruder. Processing, parameters, and film appearances are the same as those in Example #2. Two additional trials were also conducted similarly to Example #2 with green PE, a 10° C. increase in film processing temperature, and water-plasticized corn starch. Again, water is used for better gelation and flowability of starch, and to soften the starch granulates.

FIG. 7 illustrates the mechanical properties of PE2244/one step TPS (60/40 w/w) blend films under three different conditions: 1) processing temperature at 185° C.; 2) processing temperature at 175° C.; and 3) starch formulated with water before extrusion. Graph a of FIG. 7 illustrates Peak Stress; graph b of FIG. 7 illustrates Strain at Break; graph c of FIG. 7 illustrates Elastic Modulus; and graph d of FIG. 7 illustrates Energy per Volume at break. The trend in mechanical properties for green PE blend films under different processing conditions is the same as that of PE2244: either increasing processing temperature or including water as plasticizer is beneficial to obtain films with higher mechanical performance (see FIG. 7). It should be noted that the mechanical properties in the cross direction (CD) for the green PE blend film are lower than those for the PE2244 blend film.

Example #8

The green PE, FUSABONDF polymer, corn starch, and glycerin were compounded at a 47:3:37.5:12.5 w/w ratio on the ZSK-30 twin screw extruder. Processing parameters and film appearances are the same as those in Example #2. The additional trial with a 10° C. increase in film processing temperature was conducted similarly to Example #2 with green PE/TPS with 50/50 ratio.

FIG. 8 illustrates the mechanical properties of PE2244/ one step TPS (50/50 w/w) blend films produced at two different processing temperatures: 175° C. and 185° C. Graph a of FIG. 8 illustrates Peak Stress; graph b of FIG. 8 illustrates Strain at Break; graph c of FIG. 8 illustrates Elastic Modulus; and graph d of FIG. 8 illustrates Energy per Volume at break. The trend in mechanical properties for green PE blend films under different processing temperatures is the same as that of PE2244 blend films; a 10° C. increase in processing temperature improves mechanical performance, as can be seen in FIG. 8.

Example #9

The green PE, FUSABOND polymer, corn starch, and glycerin were compounded at a 42:3:41.25:13.75 w/w ratio on the ZSK-30 twin screw extruder. Processing temperatures and film appearances are the same as those in Example #2. To examine the effect of processing screw speed on the properties of resultant film, screw speeds of 250 rpm and 350 rpm were applied to the polymer melt in the twin-screw extruder. Mechanical testing results showed that higher screw speed could increase the peak stress and strain-at-break, suggesting that high shear stress is beneficial to form finer phase structure. Hence, a screw speed of 350 rpm during compounding is recommended for future processing. FIG. 9 illustrates the mechanical properties of PE2244/one step TPS (45/55 w/w) blend films under two different screw speeds during compounding: 250 rpm and 350 rpm. Graph a of FIG. 9 illustrates Peak Stress; graph b of FIG. 9 illustrates Strain at Break; graph c of FIG. 9 illustrates Elastic Modulus; and graph d of FIG. 9 illustrates Energy per Volume at break.

Example #10

Due to the rigidity and brittleness of green PE/TPS (40/60 w/w) film, different amounts of glycerol as plasticizer were tried during compounding. In addition, different amounts of FUSABOND polymer were incorporated in the blends as well. FIG. 10 illustrates the mechanical properties of the films with different formulations. The different formulations include PE2244/TPS (40/60 w/w) blend films with 3% and 5% FUSABOND polymer. The ratios of corn starch to glycerol are 3:1 and 2:1. The label with "high glycerol" represents a 2:1 cornstarch:glycerol ratio. Graph a of FIG. 10 illustrates Peak Stress; graph b of FIG. 10 illustrates Strain at Break; graph c of FIG. 10 illustrates Elastic Modulus; and graph d of FIG. 10 illustrates Energy per Volume at break.

The leftmost bar in each grouping illustrates a film with 3% FUSABOND polymer with a low level of glycerol (i.e., corn starch:glycerol=3:1) at a screw speed of 250 rpm. The composition ratio in this case is green PE:FUSABOND polymer:corn starch:glycerin=37:3:45:15 w/w.

The center bar in grouping of FIG. 10 illustrates a film formed at the same screw speed, but with an increase in glycerol and FUSABOND polymer content (green PE:FUSABOND polymer:corn starch:glycerin=35:5:40:20 w/w). These changes decreased the peak stress and elastic modulus, likely due to the softening effect of glycerol. Note that the increase in glycerol from 25% (corn starch:glycerol=3:1) to 33.3% (corn starch:glycerol=2:1) within the TPS significantly increased the strain-at-break.

The rightmost bar in each grouping of FIG. 10 illustrates the performance of film with the same formulation as in the center bar, but with the screw speed increased to 350 rpm. This change brought a trend opposite that of Example #9. As a result, the recommended condition is green PE:FUSABOND polymer:corn starch: glycerin=35:5:40:20 w/w with a screw speed of 250 rpm during compounding.

Example #11

To improve the mechanical properties of green PE/TPS films with high TPS loading levels, reprocessing, a double-compounding process, was applied to the blends to improve the conversion and dispersion of the starch phase. Green PE, FUSABOND polymer, corn starch, and glycerin were compounded at ratios of 42:3:41.25:13.75 and 35:5:40:20 ratios on the ZSK-30 twin screw extruder. Parameters and processing were the same as those of Example #2. Compounded pellets were further processed again in a Prism 16 twin extruder. The processing temperatures along the extruder were set from 160 to 170° C. Double-compounded pellets were further processed into films on a HAAKE single screw extruder, as described in Comparative Example #1. Two film processing temperatures 175 and 185° C. were tried on green PE/TPS (45/55 w/w) to examine the influence of temperature.

FIG. 11 illustrates the mechanical properties of reprocessing blend films: green PE/TPS (45/55 w/w) and (40/60 w/w). The label "re" represents reprocessing samples. "175 C" and "185 C" represents the two film processing temperatures. Graph a of FIG. 11 illustrates Peak Stress; graph b of FIG. 11 illustrates Strain at Break; graph c of FIG. 11 illustrates Elastic Modulus; and graph d of FIG. 11 illustrates Energy per Volume at break.

FIG. 11 illustrates that the reprocessing method can effectively improve the mechanical properties of the films, especially with the strain-at-break for green PE/TPS (40/60 w/w) both in machine direction (MD) and CD. This promising result showed the feasibility of application for TPS blend films with high loading level of starch. For the reprocessing of green PE/TPS (45/55 w/w), higher processing temperatures led to films with lower mechanical properties; the 185° C. film processing temperature resulted in inferior mechanical properties to those of the 175° C. processing temperature.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Disclosure are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

While particular aspects of the present disclosure have been illustrated and described, it would be obvious to those skilled in the art that various other changes, and modifications can be made without departing from the spirit and scope of the disclosure. It is therefore intended to cover in the appended claims all such changes and modifications that are within the scope of this disclosure.

What is claimed is:

1. A continuous process for manufacturing a blended polymer comprising:
   feeding separately into an extruder a native starch, a polyolefin, and a compatibilizer;
   mixing in the extruder the native starch, the polyolefin, and the compatibilizer; and
   forming the blended polymer from the resulting mixture using the extruder.

2. The process of claim 1, wherein the compatibilizer is maleic anhydride grafted polyolefin.

3. The process of claim 1, wherein the native starch is obtained from corn, waxy corn, wheat, sorghum, rice, waxy rice, potatoes, tapioca, sweet potato, arrowroot, or sago palm.

4. The process of claim 1, wherein the polyolefin is polyethylene.

5. The process of claim 4, wherein the polyethylene is bio-based.

6. The process of claim 1, wherein the extruder operates at a screw speed within the range of 250 rpm to 350 rpm.

7. The process of claim 1, wherein the extruder has a final stage, and wherein the final stage operates at a temperature of about 185° C.

8. The process of claim 1, wherein mixing further comprises mixing a processing aid.

9. The process of claim 8, wherein the processing aid is glycerin.

10. The process of claim 1, wherein forming further comprises forming the blended polymer into a film.

11. The process of claim 1, wherein the polyolefin is a petroleum-based polyethylene in the range between about 10 wt. % to about 80 wt. %.

12. The process of claim 1, wherein the polyolefin is a bio-based polyethylene in the range between about 10 wt. % to about 50 wt. %.

13. The process of claim 12, wherein the bio-based polyethylene is in the range between about 25 wt. % to about 40 wt. %.

14. A continuous process for manufacturing a blended polymer comprising:
   feeding separately into an extruder a native starch, a polyolefin, and a maleic anhydride grafted polyolefin;
   mixing in the extruder the native starch, the polyolefin, and the maleic anhydride grafted polyolefin; and
   forming the blended polymer from the resulting mixture using the extruder.

15. The process of claim 14, wherein forming further comprises forming the blended polymer into a film.

16. The process of claim 14, wherein mixing further comprises mixing a processing aid, and wherein the processing aid is glycerin.

17. A continuous process for manufacturing a blended polymer comprising:
   mixing a native starch, a polyolefin, a compatibilizer, and a processing aid, wherein the processing aid is glycerin; and
   forming the blended polymer from the resulting mixture using an extruder.

18. The process of claim 17, wherein forming further comprises forming the blended polymer into a film.

19. The process of claim 17, wherein the polyolefin is bio-based polyethylene.

* * * * *